(12) United States Patent
Azechi et al.

(10) Patent No.: US 12,011,932 B2
(45) Date of Patent: Jun. 18, 2024

(54) IMAGE RECORDING DEVICE

(71) Applicant: BROTHER KOGYO KABUSHIKI KAISHA, Nagoya (JP)

(72) Inventors: Haruka Azechi, Nagoya (JP); Shunsuke Minamikawa, Nagoya (JP); Shinya Esaki, Nagoya (JP); Yushi Deura, Nagoya (JP); Tetsuya Okuno, Nagoya (JP); Tony Lee, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 193 days.

(21) Appl. No.: 17/486,991

(22) Filed: Sep. 28, 2021

(65) Prior Publication Data
US 2022/0009241 A1 Jan. 13, 2022

Related U.S. Application Data

(63) Continuation of application No. PCT/JP2020/013608, filed on Mar. 26, 2020.

(30) Foreign Application Priority Data

Mar. 28, 2019 (JP) .................................. 2019-063839

(51) Int. Cl.
*B41J 2/175* (2006.01)
(52) U.S. Cl.
CPC ......... *B41J 2/17546* (2013.01); *B41J 2/1752* (2013.01); *B41J 2/17526* (2013.01);
(Continued)
(58) Field of Classification Search
CPC .. B41J 2/17546; B41J 2/1752; B41J 2/17526; B41J 2/17566; B41J 2002/17569; B41J 2002/17573; B41J 2002/17589
See application file for complete search history.

(56) References Cited

U.S. PATENT DOCUMENTS

| 5,802,420 A * | 9/1998 | Garr ..................... G03G 15/556 399/24 |
| 6,512,894 B2 * | 1/2003 | Takemoto ........... G07F 17/0014 399/24 |

(Continued)

FOREIGN PATENT DOCUMENTS

| CN | 1832864 A | 9/2006 |
| CN | 101060986 A | 10/2007 |

(Continued)

OTHER PUBLICATIONS

International Search Report dated Jun. 23, 2020 issued in PCT/JP2020/013608.

(Continued)

*Primary Examiner* — Jason S Uhlenhake
(74) *Attorney, Agent, or Firm* — Scully, Scott, Murphy & Presser, P.C.

(57) ABSTRACT

An image recording device includes a display panel, a cartridge mount, an information input interface, memory, and a controller. The controller obtains service provider information through the information input interface, stores the obtained service provider information in the memory, obtains first identification information or second identification information related to a cartridge mounted in the cartridge mount, sets an operation mode to a first mode in response to obtaining the first identification information, sets the operation mode to a second mode in response to obtaining the second identification information, causes the display panel to display a type of the cartridge in response to setting the operation mode to the first mode, and causes the display panel to display the service provider information in response to setting the operation mode to the second mode.

12 Claims, 13 Drawing Sheets

(52) U.S. Cl.
CPC .. *B41J 2/17566* (2013.01); *B41J 2002/17569* (2013.01); *B41J 2002/17573* (2013.01); *B41J 2002/17589* (2013.01)

(56) References Cited

U.S. PATENT DOCUMENTS

| | | |
|---|---|---|
| 2006/0161658 A1 | 7/2006 | Noguchi |
| 2008/0038034 A1 | 2/2008 | Yamaguchi et al. |
| 2008/0319877 A1 | 12/2008 | Kawai |
| 2010/0241484 A1 | 9/2010 | Nichols |
| 2014/0282996 A1 | 9/2014 | Mori |
| 2015/0262272 A1 | 9/2015 | Matsumoto |
| 2015/0316884 A1 | 11/2015 | Shinagawa |
| 2016/0292550 A1* | 10/2016 | Kawai ................. G06K 15/102 |
| 2017/0063646 A1 | 3/2017 | Kawai |
| 2018/0182021 A1 | 6/2018 | Sugamata |
| 2018/0241833 A1 | 8/2018 | Hachiya |

FOREIGN PATENT DOCUMENTS

| | | |
|---|---|---|
| CN | 103072380 A | 5/2013 |
| CN | 104049741 A | 9/2014 |
| CN | 104935769 A | 9/2015 |
| CN | 105022242 A | 11/2015 |
| CN | 108346077 A | 7/2018 |
| JP | 2001-331069 A | 11/2001 |
| JP | 2004-86055 A | 3/2004 |
| JP | 2009-3674 A | 1/2009 |
| JP | 2013-101437 A | 5/2013 |
| JP | 2016-186512 A | 10/2016 |
| JP | 2016-193592 A | 11/2016 |
| JP | 2017-49767 A | 3/2017 |
| JP | 2018-136639 A | 8/2018 |

OTHER PUBLICATIONS

First fOfice Action dated May 6, 2022 received from Chinese Patent Office in related application CN 202080025305.1 together with English language translation.
First Office Action dated May 6, 2022 received from Chinese Patent Office in related application CN 202080025305.1 together with English language translation.
International Preliminary Report on Patentability together with the Written Opinion dated Sep. 28, 2021 from related PCT/JP2020/013608.

* cited by examiner

SECOND INK REMAINING AMOUNT SCREEN

THIRD INK REMAINING AMOUNT SCREEN

IMAGE RECORDING DEVICE

CROSS-REFERENCE TO RELATED APPLICATIONS

This is a Continuation application of International Application No. PCT/JP2020/013608 filed on Mar. 26, 2020, which claims priority from Japanese Patent Application No. 2019-063839 filed on Mar. 28, 2019. The entire disclosures of the prior applications are incorporated herein by reference.

BACKGROUND

Technical Field

Aspects of the present disclosure relate to an image recording device to be used in different modes.

Related Art

As modes in which an image recording device is used, there are a mode in which a user of the image recording device makes a contract with a service provider to use the image recording device, and a mode in which the user uses the image recording device without making a contract with the service provider. The service provider provides consumables such as toner cartridges or ink cartridges of the image recording device to the user based on the contract with the user.

There has been known an image forming device to which a cartridge having an IC card is attached. In this image forming device, memory of the IC card stores a model number and the like of the cartridge. The image forming device detects a remaining amount of toner stored in a cartridge, and transmits an order sheet including the model number and the like stored in the memory of the IC card in response to approach of time for replacement of the cartridge. The content of the prior art relates to the former mode among the above-mentioned modes.

SUMMARY

According to aspects of the present disclosure, there is provided an image recording device including a display panel, a cartridge mount configured to hold a cartridge, an information input interface, memory, and a controller. The controller is configured to obtain service provider information related to a service provider through the information input interface, store the obtained service provider information in the memory, obtain first identification information or second identification information related to a cartridge mounted in the cartridge mount, set an operation mode to a first mode in response to obtaining the first identification information, set the operation mode to a second mode in response to obtaining the second identification information, cause the display panel to display a cartridge type object indicating a type of the cartridge in response to setting the operation mode to the first mode, and cause the display panel to display a provider information object indicating the service provider information in response to setting the operation mode to the second mode.

BRIEF DESCRIPTION OF THE ACCOMPANYING DRAWINGS

DETAILED DESCRIPTION

Hereinafter, embodiments of the present disclosure will be described. It is noted that the embodiments described below are merely examples of the present disclosure, and it goes without saying that the embodiments of the present disclosure can be modified appropriately without changing the scope of the present disclosure.

Figure 1:
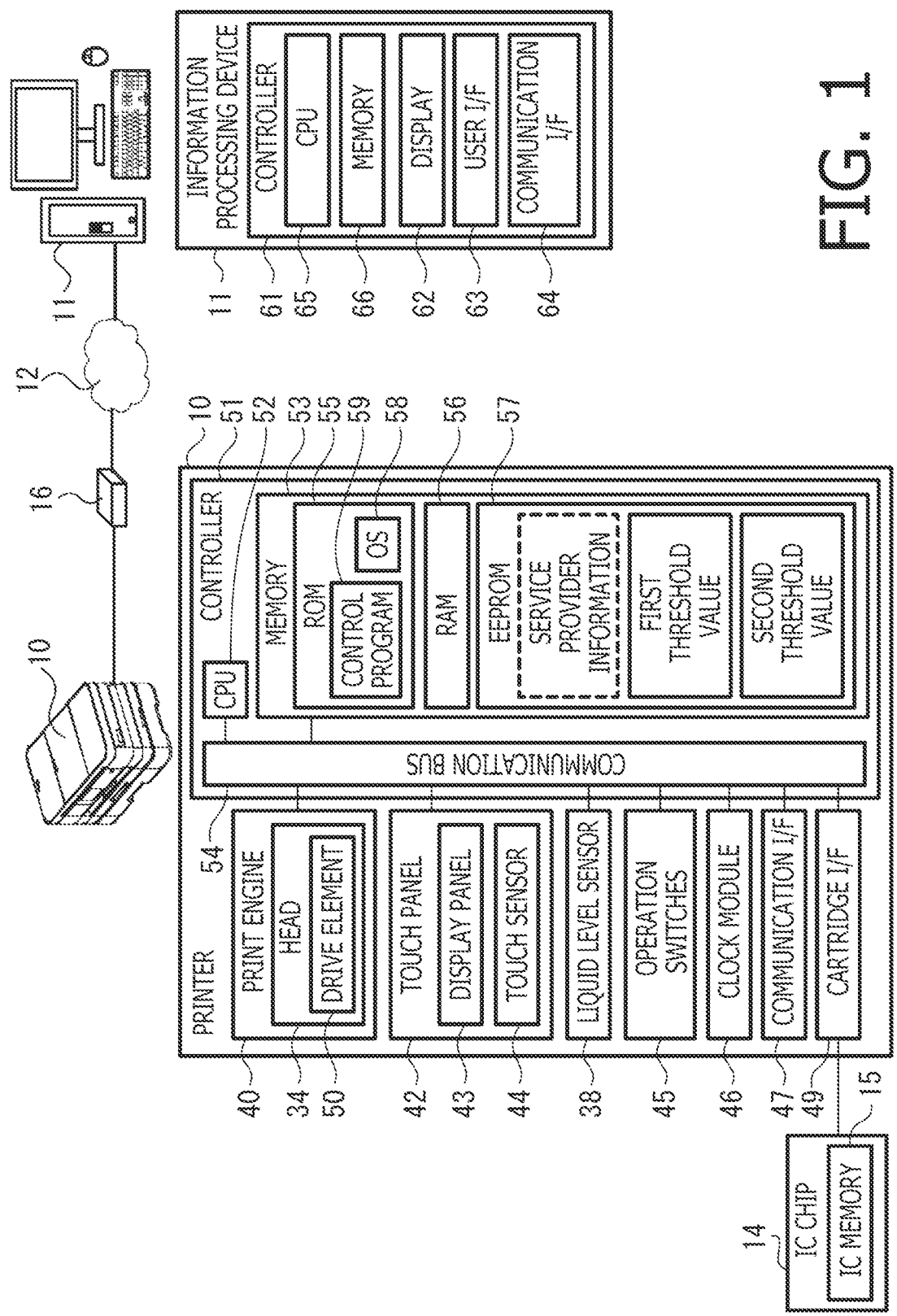
FIG. 1 is a functional block diagram of a printer 10 and an information processing device 11.

In the present embodiment, as shown in FIG. 1, a printer 10 connected to the Internet 12 will be described. The printer 10 is connected to the Internet 12 via a local network such as a LAN (Local Area Network) and a router 16. Alternatively, the printer 10 is connected to the Internet 12 via a personal computer and the router 16. The printer 10 is connected to the personal computer by a communication cable such as a USB cable.

Also, the printer 10 may transmit audio signals and/or image data to the Internet 12. That is, the printer 10 may be a multifunction peripheral with which a call function and/or a FAX function can be used through the Internet 12. It is noted that the printer 10 may be connected to the Internet 12 and a telephone line.

The printer 10 transmits information such as an e-mail and/or an HTTP request to the Internet 12 using a communication protocol such as HTTP or HTTPS. The e-mail transmitted by the printer 10 is received by the information processing device 11 through a mail server. The HTTP request transmitted by the printer 10 is received by the information processing device 11.

The information processing device 11 is a personal computer, a tablet, a mobile terminal, a server or the like. The printer 10 transmits an e-mail in a case where the information processing device 11 is a personal computer, a tablet, a portable terminal or the like and does not have a public address such as a URL that is open to the public on the Internet 12. In a case where the information processing device 11 is a server and has a public address such as a URL that is open to the public on the Internet 12, the printer 10 transmits an e-mail or an HTTP request. It is noted that the e-mail and the HTTP request, which are methods by which the printer 10 transmits information to the information processing device 11, are examples, and other methods may be used as long as information can be transmitted to the information processing device 11 through the Internet 12 and/or a telephone line.

The information processing device 11 is a device owned by a service provider that provides a service to a user of the printer 10, or a device that the service provider is authorized to use. The service provider provides a service to the user of the printer 10 by using the information processing device 11. For example, the service provider uses the information processing device 11 to monitor the remaining amounts of consumables such as inks or toners stored in respective cartridges 13, which will be described later, attached to the printer 10. Then, before a consumable runs out, the service provider ships a new cartridge 13 to the user or arranges the shipment. The user replaces an old cartridge 13 in which the consumable is used up with the delivered new cartridge 13.

The printer 10 is used in a mode in which a user makes a contract with a service provider to use the printer 10 (hereinafter also referred to as a contract usage mode), and is also used in a mode in which the user does not make a contract with the service provider to use the printer 10 (hereinafter also referred to as a normal usage mode). That is, the printer 10 can be used in the contract usage mode and the normal usage mode. The printer 10 determines whether it is used in the contract usage mode or in the normal usage mode, and changes contents to be displayed on a display panel 43 in accordance with the determination result.

The information processing device 11 includes a controller 61, a display 62, a user I/F 63, and a communication I/F 64. "I/F" stands for interface. The user I/F 63 is a mouse, a keyboard, or the like.

The controller 61 mainly includes a CPU 65, memory 66, and a communication bus. The CPU 65, the memory 66, the display 62, the user I/F 63, and the communication I/F 64 are connected to the communication bus. That is, the CPU 65 is connected to the memory 66, the display 62, the user I/F 63, and the communication I/F 64 via the communication bus so as to be able to exchange information and data with each other.

The memory 66 is a ROM, a RAM, a hard disk, or the like. The memory 66 stores an OS being an operating system, and a device program, and a mailer. Instructions described in the OS, the device program and the mailer are executed by the CPU 65. That is, the OS, the device program and the mailer are executed by the CPU 65. The OS, the device program, and the mailer, which are executed by the CPU 65, cause the display 62 to display images, receive user inputs through the user I/F 63, transmit and receive information and data through the communication I/F 64, and store the received information and data in the memory 66.

Figure 2A:
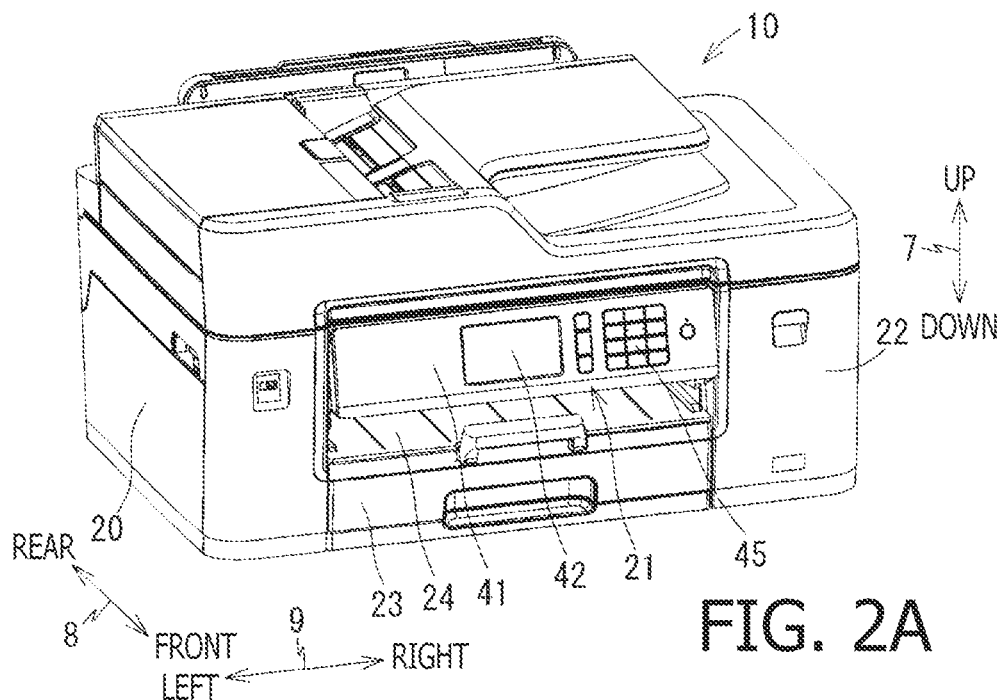
FIG. 2A is a perspective view of the printer in a state where a cover is closed.
Figure 2B:
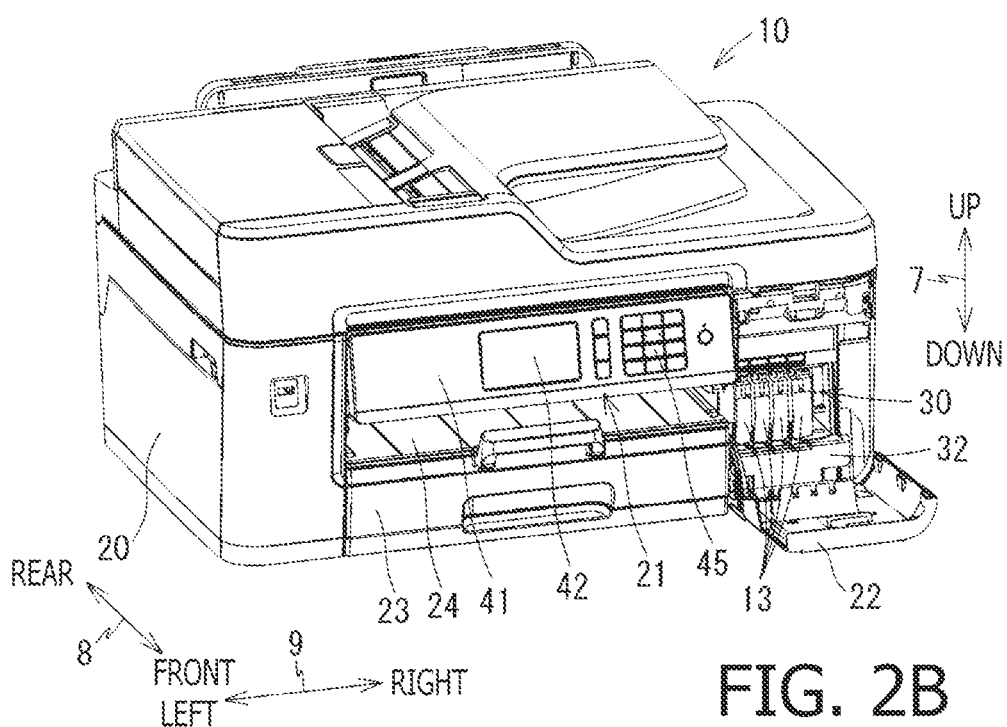
FIG. 2B is a perspective view of the printer in a state where the cover is open.
Figure 3:
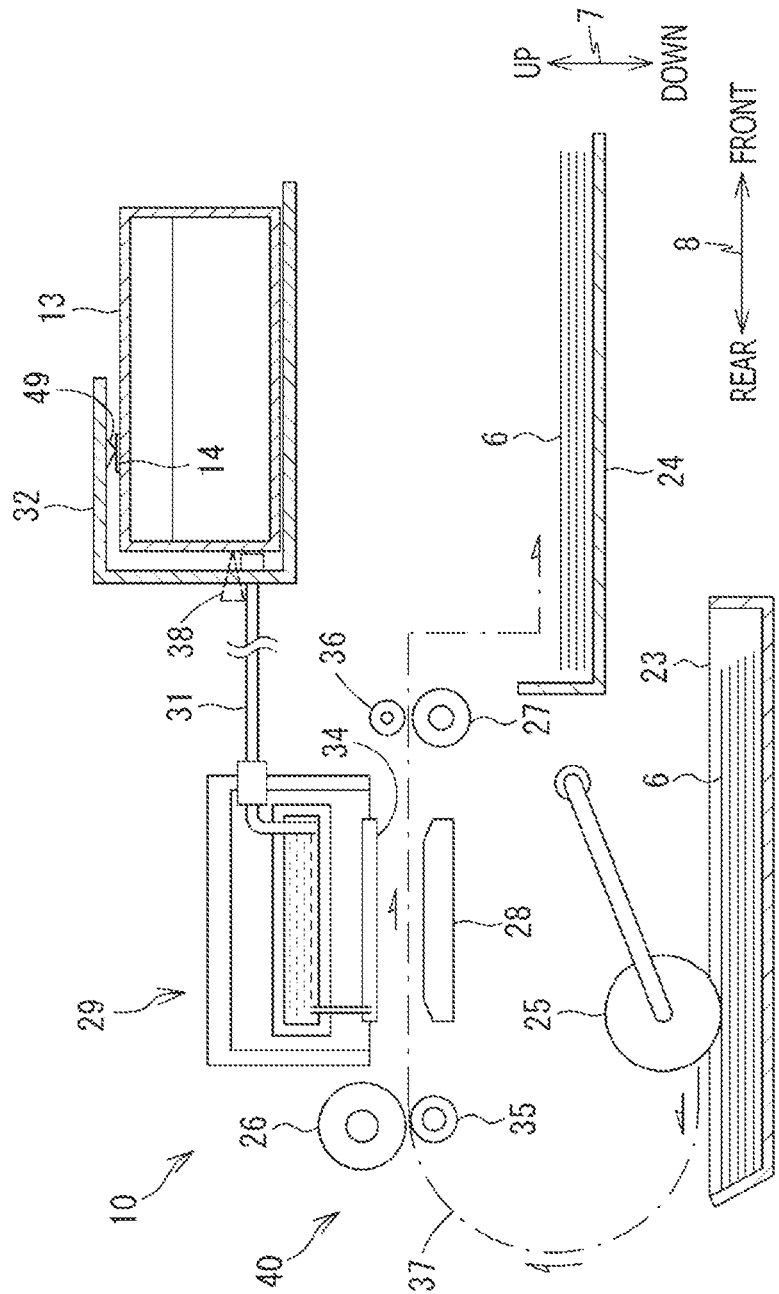
FIG. 3 is a schematic cross-sectional view of the printer.

As shown in FIG. 2, the printer 10 includes a housing 20, and a panel assembly 21, a cover 22, a sheet feed tray 23 and a sheet discharge tray 24 that are held by the housing 20.

The panel assembly 21 includes a panel body 41, and a touch panel 42 and a plurality of operation switches 45 held by the panel body 41. The panel body 41 has a rectangular plate shape and is attached to one surface of the housing 20. In the following description, in a state in which the printer 10 is placed on a horizontal surface, a front-rear direction 8 is defined with one surface of the housing 20 on which the panel body 41 is placed as a front surface, and a direction along a vertical direction is defined as an up-down direction 7. Further, the left and right when the printer 10 is viewed from the front are defined as a left-right direction 9. The front-rear direction 8 and the left-right direction 9 are parallel to the horizontal surface, are orthogonal to the up-down direction 7, and are orthogonal to each other.

As shown in FIG. 1, the touch panel 42 has a display panel 43 that displays an image, and a transparent film-shaped touch sensor 44 that is superimposed on the display panel 43. The touch sensor 44 outputs position information indicating a position on the display panel 43 touched by the user. The position information is, for example, coordinates (x, y) on the x-y plane when an upper left end of the display panel 43 is set as the origin, a right direction is set as the positive direction of the x axis, and a downward direction is set as the positive direction of the y axis.

The display panel 43 and the touch sensor 44 of the touch panel 42 are connected to a controller 51 (FIG. 1) described later by a cable or the like. The controller 51 outputs image data to the display panel 43 to cause the display panel 43 to display an image. The controller 51 also receives the position information output from the touch sensor 44. The controller 51 determines an object such as an icon displayed at a position indicated by the position information input from the touch sensor 44 as an object selected by the user.

Each operation switch 45 has a contact that is opened or closed in accordance with a user operation. The operation switch 45 outputs a detection signal having a voltage value that varies depending on whether the contact is opened or closed. The operation switch 45 is connected to the controller 51 by a cable or the like. The controller 51 determines whether the operation switch 45 is operated by the user based on a voltage value of a detection signal input from the operation switch 45. It is noted that only one of either the touch sensor 44 or the operation switches 45 may be provided to the panel assembly 21.

As shown in FIG. 2, the sheet feed tray 23 is located at a lower portion of the housing 20 and is detachably held by the housing 20. The sheet discharge tray 24 is located at a lower portion of the housing 20 and above the sheet feed tray 23, and is held by the sheet feed tray 23 or the housing 20. The cover 22 is positioned at the right portion of the front surface of the housing 20 and is rotatably held by the housing 20. The cover 22 rotates between a closed position at which the cover 22 closes an opening 30 provided at the right portion of the housing 20 and an open position at which the cover 22 opens the opening 30. A mounting case 32 is disposed behind the opening 30 and held by the housing 20. The mounting case 32 has a configuration of detachably holding the cartridges 13. Since this configuration is well known, detailed description thereof will be omitted.

The mounting case 32 detachably holds the plurality of cartridges 13. In the illustrated example, the mounting case 32 detachably holds four cartridges 13. Each of the four cartridges 13 stores, for example, ink of one of magenta, cyan, yellow, and black colors. That is, the printer 10 is a so-called inkjet printer and is a so-called color printer. However, the mounting case 32 may detachably hold only one cartridge 13 storing ink of black color. That is, the printer 10 may be a so-called monochrome printer. The mounting case 32 may detachably hold one or more cartridges 13 each containing toner instead of ink. That is, the printer 10 may be a so-called laser printer.

The mounting case 32 has a cartridge I/F 49 shown in FIG. 1. The cartridge I/F 49 includes, for example, terminals each corresponding to one of the cartridges 13. The cartridge I/F 49 is located at a position where it contacts electrodes of IC chips 14 which the cartridges 13 mounted in the mounting case 32 have. The cartridge I/F 49 is connected to the controller 51 described later by a cable.

It is noted that the cartridge I/F 49 may be an antenna. For example, as the cartridge I/F 49, a substrate having a pattern antenna is located in the mounting case 32. Each IC chip 14 has a similar antenna. The cartridge I/F 49 outputs radio waves to be received by the antenna of an IC chip 14 and the antenna of the IC chip 14 receives the output radio wave. That is, the cartridge I/F 49 receives information or data from the IC chip 14 and transmits information or data to the IC chip 14 by way of radio waves.

The cartridge I/F 49 may also be a light emitting diode and a photodiode. For example, as the cartridge I/F 49, a substrate having a light emitting diode and a photodiode is located in the mounting case 32. The IC chip 14 has a similar light emitting diode and a similar photodiode. The cartridge I/F 49 emits light to be received by the photodiode of the IC chip 14 and receives light emitted by the light-emitting diode of the IC chip 14. That is, the cartridge I/F 49 may receive information or data from the IC chip 14 and transmit information or data to the IC chip 14 by way of light.

A liquid level sensor 38 is provided to the mounting case 32. The liquid level sensor 38 is, for example, a photo interrupter having a light emitting diode and a photodiode. The liquid level sensor 38 is provided such that the cartridge 13 mounted in the mounting case 32 is positioned on an optical path between the light emitting diode and the photodiode. The cartridge 13 has a light-transmitting property at a portion positioned on the optical path. For example, the cartridge 13 is manufactured by using a resin molded product having a light-transmitting property in at least a part of the cartridge 13.

The liquid level sensor 38 is positioned such that the above-described optical path is between an upper end and a lower end of the cartridge 13 in the up-down direction 7. In the illustrated example, the optical path of the liquid level sensor 38 is positioned below an intermediate position between the upper end and the lower end of the cartridge 13 in the up-down direction 7. The liquid level sensor 38 outputs a first detection signal when ink is on the optical path, and outputs a second detection signal different from the first detection signal when ink is not on the optical path. In the following description, the position of the optical path of the liquid level sensor 38 is referred to as a "detection position."

The liquid level sensor 38 is connected to the controller 51 using a cable or the like. That is, the first detection signal and the second detection signal output from the liquid level sensor 38 are input to the controller 51. The controller 51 determines whether a liquid level of the ink stored in the cartridge 13 mounted in the mounting case 32 has reached the detection position based on whether the signal input from the liquid level sensor 38 is the first detection signal or the second detection signal. Details will be described later.

The cartridge 13 has a box shape having an internal space for storing ink. Since the basic configuration of the cartridge 13 is well known, detailed description thereof will be omitted. The cartridge 13 includes the IC chip 14. In the illustrated example, the IC chip 14 is attached to an upper surface of the cartridge 13. The IC chip 14 has an electrode that contacts the cartridge I/F 49, which is a terminal, and an IC memory 15 electrically connected to the electrode. Alternatively, the IC chip 14 has an antenna such as a pattern antenna, or a light emitting diode and a photodiode in place of the electrode. The IC memory 15 stores various information. Specifically, the IC memory 15 stores at least a model number, type information, an initial storing amount value, and a serial number.

The model number is identification information assigned to the cartridge 13 in accordance with the color of ink stored in the cartridge 13 and the type of ink such as dye or pigment. The type information is information indicating whether the cartridge 13 is a cartridge be to be used in the contract usage mode or a cartridge to be used in the normal usage mode. For example, the type information is 1-bit data that is stored at a predetermined address of the IC memory 15 and that indicates "0" or "1." For example, "1" indicates that the cartridge is to be used in the contract usage mode, and "0" indicates that the cartridge is used in the normal usage mode. However, the type information may be included in the model number. That is, one model number may indicate the color and type of one ink and whether the ink is to be used in the normal usage mode or the contract usage mode.

The initial storing amount value indicates an initial amount of ink stored in the cartridge 13. The initial storing amount value is used for calculation of the remaining amount of ink in the cartridge 13 and the like by the controller 51. The serial number is a number for identifying each cartridge 13. The serial number is used by the controller 51 to determine whether the cartridge 13 has been replaced. For example, in response to the serial number obtained from the IC memory 15 not matching the serial number stored in the memory 53, the controller 51 described later determines that the cartridge 13 has been replaced. Details will be described later.

The housing 20 holds the print engine 40 therein. The print engine 40 mainly includes a sheet feed roller 25, a conveying roller 26, a discharge roller 27, a platen 28, and a recording unit 29. The sheet feed roller 25 is held by a frame provided in the housing 20 so as to be able to contact a sheet 6 placed on the sheet feed tray 23. The sheet feed roller 25 is rotated by a motor. The rotating sheet feed roller 25 feeds the sheet 6 to a conveyance path 37. The conveyance path 37 is a space defined by a guide member. In the illustrated example, the conveyance path 37 extends in a curved manner from a rear end of the sheet feed tray 23 to a position above the sheet feed tray 23, and then extends forward.

The conveying roller 26 is located downstream of the sheet feed tray 23 in a conveying direction of the sheet 6. The conveying roller 26 and a driven roller 35 constitute a roller pair. The conveying roller 26 is rotated by a motor. The rotating conveying roller 26 and driven roller 35 convey the sheet 6 fed to the conveying path 37 by the sheet feed roller 25 while nipping the sheet 6. The discharge roller 27 is located downstream of the conveying roller 26 in the conveying direction of the sheet 6. The discharge roller 27 and a driven roller 36 constitute a roller pair. The discharge roller 27 is rotated by a motor. The rotating discharge roller 27 and driven roller 36 convey the sheet 6 while nipping the sheet 6, and discharge the sheet 6 onto the sheet discharge tray 24. The platen 28 is located between the conveying roller 26 and the discharge roller 27 in the front-rear direction 8, and downstream of the conveying roller 26 and upstream of the discharge roller 27 in the conveying direction of the sheet 6.

The recording unit 29 is located above the platen 28. The recording unit 29 may be held by a guide rail that is a part of the frame so as to be movable in the left-right direction 9 (FIG. 2A), or may be fixed to the frame. That is, the printer may be a so-called serial printer or a so-called line printer. The recording unit 29 has a head 34. The head 34 has channels therein through which ink flows. The channels communicate with the internal space of the cartridge 13 mounted in the mounting case 32 via a tube 31. That is, the ink stored in the cartridge 13 is supplied to the head 34 through the tube 31.

As shown in FIG. 1, the head 34 has a drive element 50. A portion of the drive element 50 constitutes a channel inside the head 34. The drive element 50 is electrically connected to the controller 51 by a cable or the like. The driving element 50 is a piezoelectric element or a heater. The driving element 50 being a piezoelectric element deforms by being supplied with a direct current voltage, applies pressure to ink in the channel, and causes ink droplets to be ejected from a nozzle being an opening of the channel. The driving element 50 being a heater generates heat by being supplied with a direct current voltage, causes ink in the channel to bump, and causes ink droplets to be ejected from the nozzle.

The number of ink droplets ejected from the nozzle can be specified from the number of times of supply of the direct current voltage or a direct current to the drive element 50. That is, the controller 51 calculates a count value of the number of ejected ink droplets by counting the number of times of the supply. The count value is used for calculation of the remaining amount of ink and the like. Details will be described later.

The printer 10 further includes the controller 51, a clock module 46 and a communication I/F 47 shown in FIG. 1. The clock module 46 is, for example, an IC that outputs date and time information indicating the date and time.

The controller 51 includes a CPU 52, memory 53, and a communication bus 54. The CPU 52, the memory 53, the touch panel 42, the operation switches 45, the communication I/F 47, and the cartridge I/F 49 are connected to the communication bus 54. That is, the CPU 52 is connected to the memory 53, the touch panel 42, the operation switches 45, the communication OF 47 and the cartridge I/F 49 via the communication bus 54 so as to be able to exchange information and data with each other.

The memory 53 includes a ROM 55, a RAM 56, and an EEPROM 57. The ROM 55 stores an OS 58 being an operating system and a control program 59 in advance. Instructions described in the OS 58 and the control program 59 are executed by the CPU 52. That is, the OS 58 and control program 59 are executed by the CPU 52. The OS 58 and the control program 59 executed by the CPU 52 causes the display panel 43 to display an image and receives an input from the user through the touch sensor 44 and/or the operation switches 45. The OS 58 and the control program 59 executed by the CPU 52 transmit and receive information and data through the communication I/F 47 and the cartridge I/F 49, and stores the received information and data in the memory 53.

The control program 59 may be a single program or a program including a plurality of modules. The control program 59 has, for example, a UI (abbreviation of User Interface) module, a communication module, and a print control module. Every module is executed quasi-concurrently by so-called multitasking.

The UI module is a program that inputs image data to the display panel 43, causes the display panel 43 to display an image including objects such as icons, and receives a signal output from the touch sensor 44 and/or the operation switches 45.

The communication module is a program for transmitting and receiving information and data in accordance with a communication protocol of a communication line to which the communication I/F 47 is connected. For example, in a case where the communication I/F 47 is connected to a USB cable, the communication module transmits and receives information and date using a communication protocol. In a case where the communication I/F 47 is connected to a LAN cable, or in a case where the communication I/F 47 is connected via a wireless local area network (LAN), the communication module transmits and receives information and data using a communication protocol such as TCP/IP.

The print control module is a program that generates and outputs drive signals to be input to drive circuits of the above-mentioned motors and a drive circuit of the drive element 50 based on print data.

The ROM 55 also stores pieces of image data indicating various screens described later. Details will be described later. The RAM 56 is used for execution of the OS 58 and control program 59, and temporarily stores information and data in the execution of the OS 58 and control program 59. The EEPROM 57 stores a first threshold value and a second threshold value in advance, and stores service provider information and the like input through the communication I/F 47. Details will be described later. It is noted that the first threshold value and the second threshold value may be stored in the ROM 55.

Hereinafter, processes executed by the control program 59 will be described with reference to FIGS. 4 to 13. It is noted that, in the following description, processes executed by the control program 59 will be described as processes executed by the controller 51 (particularly, the CPU 52).

Figure 4:
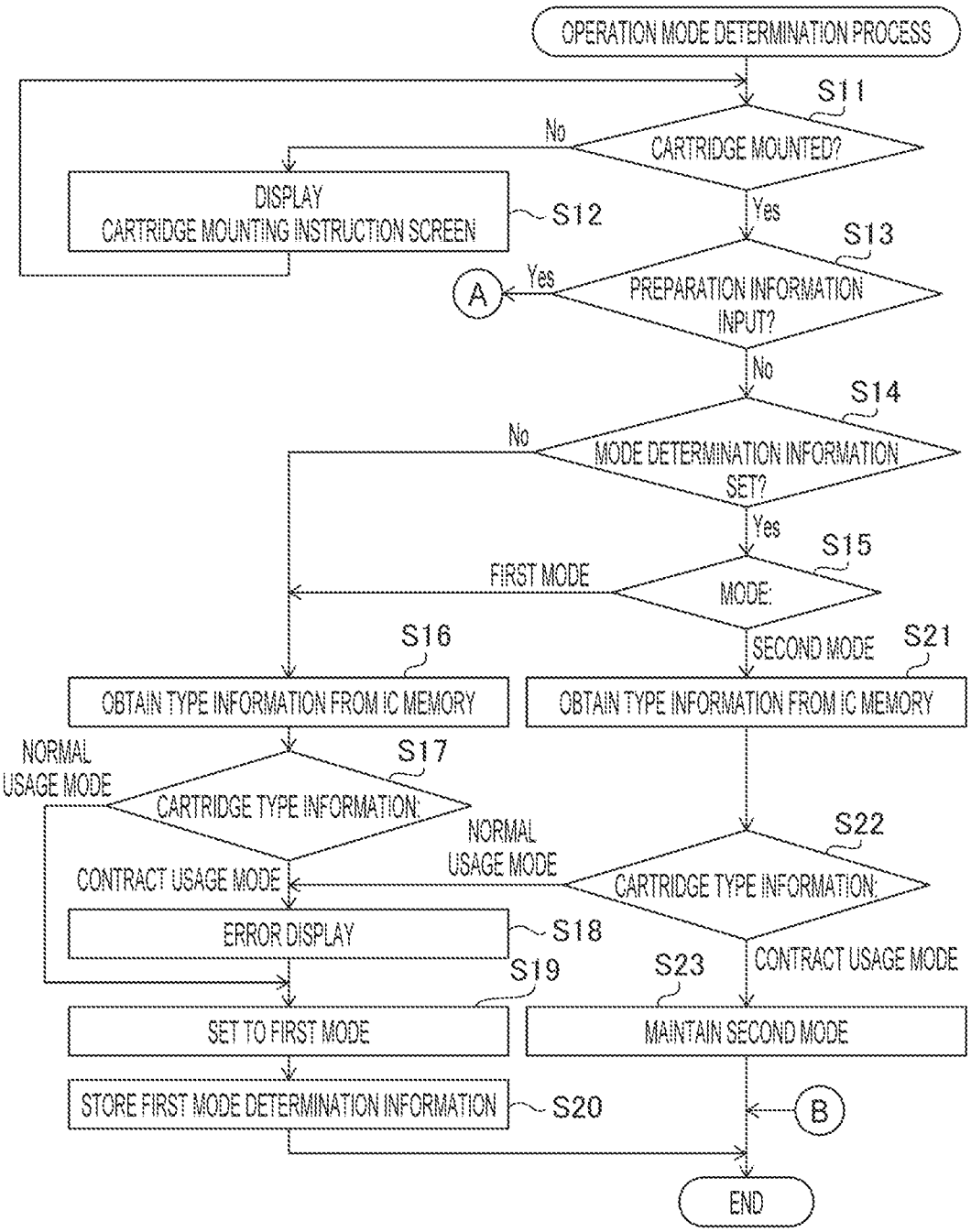
FIG. 4 is a part of a flowchart of an operation mode determination process.
Figure 5:
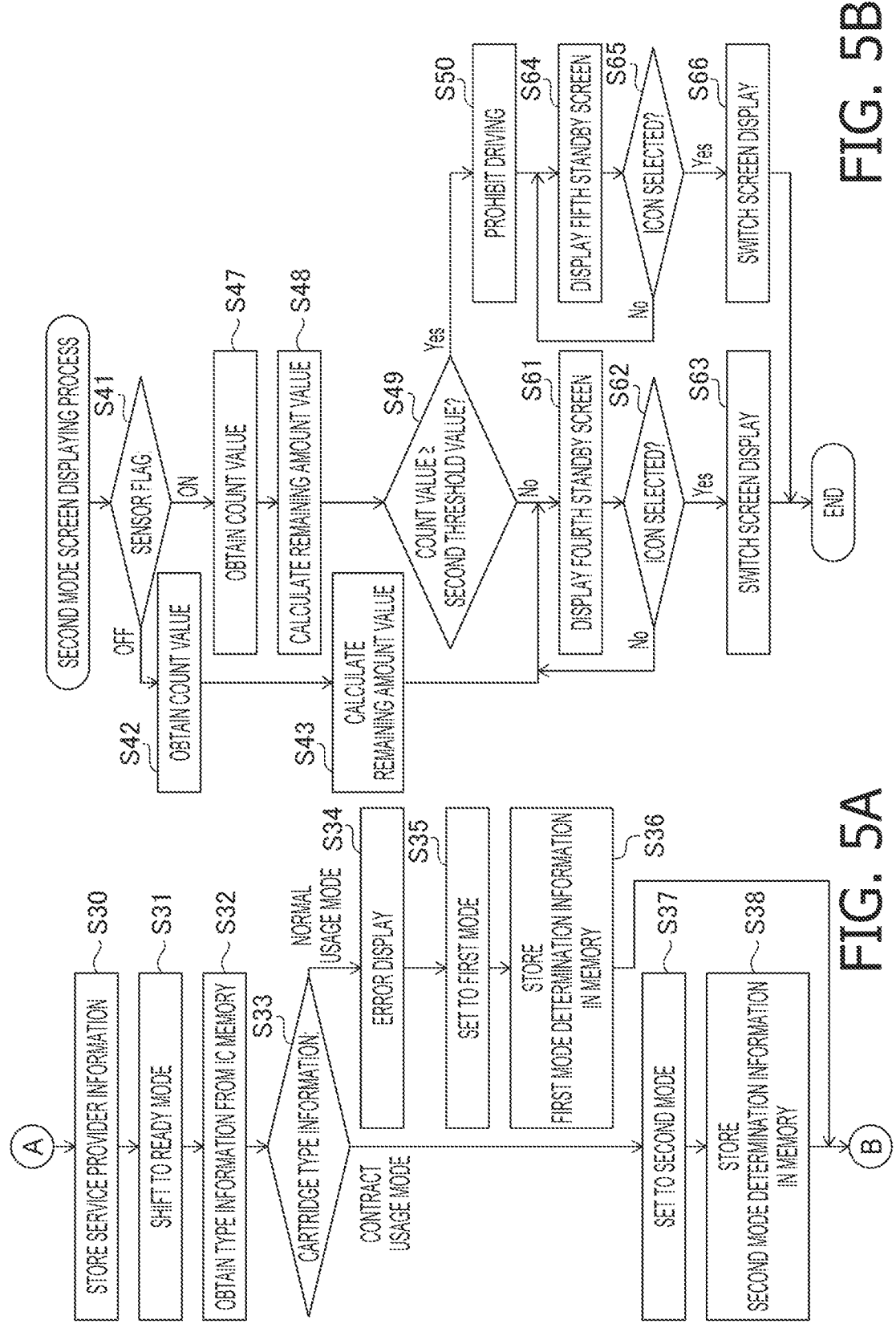
FIG. 5A is another part of the flowchart of the operation mode determination process.
FIG. 5B is a flowchart of a second mode screen displaying process.

The controller 51 executes an operation mode determination process illustrated in FIG. 4 in response to being powered on or a specific operation signal being input from the touch sensor 44 or the operation switch 45. The operation mode determination process is a process of setting an operation mode to a first mode in which the printer 10 is used in the normal usage mode or to a second mode in which the printer 10 is used in the contract usage mode.

In detail, first, the controller 51 executes a process corresponding to a determination on whether the cartridge 13 is mounted in the mounting case 32 (S11). Specifically, the controller 51 determines whether communication with the IC chip 14 is possible through the cartridge I/F 49. The controller 51 determines that the cartridge 13 is mounted in the mounting case 32 based on the fact that the controller 51 can communicate with the IC chip 14 through the cartridge I/F 49 (S11: Yes). The controller 51 determines that the cartridge 13 is not mounted in the mounting case 32 based on the fact that the controller 51 cannot communicate with the IC chip 14 through the cartridge I/F 49 (S11: No).

It is noted that the controller 51 may execute a process other than the above-described process as long as the process corresponds to the determination on whether the cartridge 13 is mounted in the mounting case 32. For example, a mounting sensor may be provided to the mounting case 32. The mounting sensor is a photo interrupter provided such that the cartridge 13 mounted in the mounting case 32 is positioned on the optical path. The mounting sensor outputs a first detection signal when the cartridge 13 is mounted in the mounting case 32. On the other hand, when the cartridge 13 is not mounted in the mounting case 32, the mounting sensor outputs a second detection signal different from the first detection signal. The controller 51 determines whether the first detection signal or the second detection signal is input from the mounting sensor (S11). In response to the input of the first detection signal from the mounting sensor, the controller 51 determines that the cartridge 13 is mounted in the mounting case 32 (S11: Yes). In response to the input of the second detection signal from the mounting sensor, the controller 51 determines that the cartridge 13 is not mounted in the mounting case 32 (S11: No).

The controller 51 executes the determination of step S11 for all the cartridges 13 that are mounted in the mounting case 32. When the controller 51 determines that at least one cartridge 13 is not mounted in the mounting case 32 (S11: No), the controller 51 causes the display panel 43 to display a cartridge mounting instruction screen (S12). Specifically, the controller 51 reads image data indicating the cartridge mounting instruction screen which is stored in advance in the ROM 55 of the memory 53, and outputs the image data to the display panel 43. The cartridge mounting instruction screen is, for example, a screen including characters indicating opening of the cover 22 and mounting of the cartridge 13 to the mounting case 32. For example, when the operator who installs the printer 10 turns on the power of the printer 10 after installing the printer 10, an instruction screen is displayed on the display panel 43.

The controller 51 causes the display panel 43 to display the cartridge mounting instruction screen until the controller 51 determines that all the cartridges 13 are mounted in the mounting case 32. When the controller 51 determines that all the cartridges 13 are mounted in the mounting case 32 (S11: Yes), the controller 51 determines whether preparation information has been input (S13).

The preparation information is input to the controller 51 from the touch sensor 44 and/or the operation switches 45 operated by the operator. Alternatively, the preparation information is input to the controller 51 through the communication I/F 47 from a tablet, a personal computer or a portable terminal connected to the communication I/F 47 via a USB cable or the like. Alternatively, the preparation information is input from the information processing device 11 to the controller 51 through the Internet 12 and the communication I/F 47.

Further alternatively, the preparation information is input to the controller 51 from a portable storage medium such as a USB memory attached to the printer 10. It is noted that, in a case where the preparation information is input to the controller 51 from the touch sensor 44 and/or the operation switches 45, a procedure of inputting the preparation information to the printer 10 is not disclosed to general users by an instruction manual or the like but is disclosed only to the service providers.

For example, the controller 51 receives the input of the preparation information until the cartridges 13 are mounted to the mounting case 32 (S13: No). Alternatively, the controller 51 may cause the display panel 43 to display a reception screen for receiving the preparation information, and may receive the input of the preparation information while causing the display panel 43 to display the reception screen. When the controller 51 determines that the preparation information has been input (S13: Yes), as shown in FIG. 5A, the controller 51 stores the service provider information in the EEPROM 57 of the memory 53 (S30). The service provider information is input to the controller 51 by the operator operating the touch sensor 44 and/or the operation switches 45. Alternatively, the service provider information is input to the controller 51 from a tablet, a personal computer or a portable terminal through the communication I/F 47. Alternatively, the service provider information is input from the information processor 11 to the controller 51 via the Internet 12 and the communication I/F 47. Alternatively, the service provider information is stored in advance in the IC memory 15 of the IC chip 14, and is input to the controller 51 through the cartridge I/F 49.

Further alternatively, the service provider information is input to the controller 51 from a portable storage medium such as a USB memory attached to the printer 10. The controller 51 stores the inputted service provider information in the EEPROM 57. It is note that the service provider information may be input to the controller 51 together with the preparation information or may be input to the controller 51 separately from the preparation information.

Next, the controller 51 shifts to a ready mode (S31). The ready mode is a mode in which the controller 51 can determine to set the second mode indicating the contract usage mode. That is, in a state other than the ready mode, the controller 51 never determines to be the second mode. The controller 51 shifts to the ready mode by, for example, storing a ready mode flag of "ON" indicating the ready mode in a predetermined storage area in the EEPROM 57. An initial value of the ready mode flag is "OFF". The controller 51 stores the ready mode flag of "OFF" in the EEPROM 57 in response to determining to be the first mode or the second mode in steps S35 and S37 described later.

After shifting to the ready mode (S31), the controller 51 obtains the type information from the IC memory 15 of the IC chip 14 through the cartridge I/F 49 (S32). Then, the controller 51 executes a process corresponding to a determination as to whether the obtained type information indicates a cartridge to be used in the contract usage mode or a cartridge to be used in the normal usage mode (S33). Specifically, the controller 51 determines whether the obtained type information is "1" indicating the contract usage mode or "0" indicating the normal usage mode.

When the controller 51 determines that the obtained type information is "1" indicating the contract usage mode (S33: contract usage mode), the controller 51 sets the operation mode to the second mode (S37) and stores second mode determination information indicating that the operation mode is set to the second mode in the EEPROM 57 of the memory 53 (S38). For example, the controller 51 stores a second mode flag of "ON" indicating that the operation mode is set to the second mode in a predetermined storage area in the EEPROM 57. The initial value of the second mode flag is "OFF."

On the other hand, when the controller 51 determines that the obtained type information is "0" indicating the normal usage mode (S33: normal usage mode), the controller 51 performs error display for displaying a first error screen on the display panel 43 (S34). That is, when the cartridge 13 in the normal usage mode is mounted in the mounting case 32 of the printer 10 in spite of the fact that the preparation information and the service provider information are input to the printer 10 in order to use the printer 10 in the second mode, the first error screen is displayed on the display panel 43.

Specifically, the controller 51 reads image data indicating the first error screen stored in advance in the ROM 55 of the memory 53 and outputs the image data to the display panel 43. The first error screen includes, for example, characters "AN APPROPRIATE CARTRIDGE IS NOT MOUNTED. PLEASE MOUNT AN APPROPRIATE CARTRIDGE." and an "OK" icon.

It is noted that the controller 51 may determine whether the cartridge 13 mounted in the mounting case 32 is the cartridge 13 to be used in the normal usage mode or the cartridge 13 to be used in the contract usage mode based on the model number of the cartridge 13 in place of the type information. In this case, the ROM 55 or EEPROM 57 of the memory 53 stores in advance a table in which the model numbers of the cartridges 13 are associated with the normal usage mode and the contract usage mode.

Although not shown in the flowchart, the controller 51 executes processes on and after step S37 in response to, for example, the operator remounting an appropriate cartridge 13 to the mounting case 32 and selecting the "OK" icon. For example, in response to the operator selecting the "OK" icon without mounting the appropriate cartridge 13 to the mounting case 32, the controller 51 executes the processes on an after step S35. Alternatively, after the first error screen is displayed on the display panel 43, the controller 51 starts counting of a countdown timer, and executes processes on after step S35 in response to the countdown timer being timed up.

When the controller 51 determines that in the determination at step S33 all the pieces of type information obtained from all the cartridges 13 mounted in the mounting case 32 are "1" indicating the contract usage mode, the controller 51 sets the operation mode to the second mode (S37). When the controller 51 determines that at least one of all the pieces of type information obtained from all the cartridges 13 is "0" indicating the normal usage mode, the controller 51 causes the display panel 43 to display the first error screen (S34).

After displaying the first error screen on the display panel 43 (S34), the controller 51 sets the operation mode to the first mode (S35) and stores first mode determination information indicating that the operation mode has been set to the first mode in the EEPROM 57 of the memory 53. For example, a first mode flag of "ON" indicating that the operation mode is set to the first mode is stored in a predetermined storage area in the EEPROM 57 (S36). An initial value of the first mode flag is "OFF."

It is noted that there is a case where a cartridge 13 whose type information cannot be obtained by the controller 51 through the cartridge I/F 49 is mounted to the mounting case 32. Although not shown in the flowchart, the controller 51 may determine whether the type information has been obtained through the cartridge I/F 49 before executing the process of step S32. The controller 51 executes the process of step S33 in response to determining that the type information has been obtained, and executes the processes on and after step S34 in response to determining that the type information has not been obtained. As shown in FIG. 4, the controller 51 ends the operation mode determination process after executing the process of step S38 or step S36.

It is noted that, although an example in which the first mode flag and the second mode flag are separately stored in the EEPROM 57 has been described, a flag which "OFF" indicates the first mode and "ON" indicates the second mode may be stored in the EEPROM 57. In this case, an initial value of the flag is "OFF" indicating the first mode.

When the controller 51 determines that in step S13 the preparation information has not been input (S13: No), the controller 51 executes a process corresponding to a determination on whether the mode is already set (S14). Specifically, the controller 51 determines whether the value of the first mode flag or the second mode flag is "ON" or "OFF."

When the controller 51 determines that the mode is not set and the values of the first mode flag and the second mode flag are both "OFF" (S14: No), the controller 51 obtains the type information from the IC memory 15 of the IC chip 14 through the cartridge I/F 49 (S16). Then, the controller 51 determines whether the obtained type information indicates the contract usage mode or the normal usage mode in the same manner as in step S33 (S17).

In response to determining that the obtained type information indicates the contract usage mode (S17: contract usage mode), the controller 51 performs an error display for displaying a second error screen on the display panel 43 (S18). That is, when the cartridge 13 for the contract usage mode is mounted to the mounting case 32 without the preparation information and the service provider information being input to the printer 10, the second error screen is displayed on the display panel 43.

Specifically, the controller 51 reads image data indicating the second error screen from the ROM 55 of the memory 53 and outputs the image data to the display panel 43. The second error screen includes, for example, characters such as "ERROR" or "CARTRIDGE IS NOT MOUNTED IN AN APPROPRIATE PROCEDURE. PLEASE MOUNT THE CARTRIDGE IN AN APPROPRIATE PROCEDURE." and an "OK" icon. That is, the second error screen is a screen that prompts the operator to perform an appropriate procedure for inputting the preparation information and the service provider information to the printer 10.

Although not shown in the flowchart, for example, the controller 51 receives the input of the preparation information and the service provider information described above while displaying the second error screen on the display panel 43. Then, in response to the input of the preparation information and the service provider information, the controller 51 executes the processes on and after step S30 and the processes on and after step S37.

For example, in response to selection of the "OK" icon without the input of the preparation information, the controller 51 executes the processes on and after step S19. Alternatively, after displaying the second error screen on the display panel 43, the controller 51 starts counting a countdown timer, and executes the processes on and after step S19 in response to the countdown timer being timed up. On the other hand, in response to determining in step S17 that the obtained type information indicates the normal usage mode (S17: normal usage mode), the controller 51 skips the process of step S18 and executes the processes on and after step S19.

In response to determining that the obtained type information indicates the normal usage mode (S17: normal usage mode), or after executing the error display at step S18, the controller 51 sets the operation mode to the first mode (S19). That is, unless the preparation information is input to the printer 10, even if the cartridge 13 for the contract usage mode is mounted to the mounting case 32, the operation mode will not be set to the second mode indicating the contract usage mode. After setting to the first mode (S19), the controller 51 stores the first mode determination information in the EEPROM 57 in the same manner as in step S36 (S20), and ends the operation mode determination process.

When the controller 51 determines that in step S14 the mode has already been set and the value of the first mode flag or the second mode flag is "ON" (S14: Yes), the controller 51 determines the type of the operation mode (S15). Specifically, the controller 51 determines whether the value of the first mode flag is "ON" or the value of the second mode flag is "ON."

When the controller 51 determines that the value of the first mode flag is "ON" (S15: first mode), the controller 51 executes the processes on and after step S16. When the controller 51 determines that the value of the second mode flag is "ON" (S15: second mode), the controller 51 obtains the type information from the IC memory 15 of the IC chip 14 through the cartridge OF 49 (S21). Then, the controller 51 determines whether the obtained type information indicates the contract usage mode or the normal usage mode in the same manner as in step S33 (S22).

In response to determining that the obtained type information indicates the normal usage mode (S22: normal usage mode), the controller 51 executes the processes on and after step S18. In this case, in the process of step S20, the first mode flag having the value of "ON" is stored in EEPROM 57, and the second mode flag having the value of "OFF" is stored in EEPROM 57. That is, in the printer 10 operating in the second mode, when the cartridge 13 for the contract usage mode is replaced with the cartridge 13 for the normal usage mode, the operation mode changes from the second mode to the first mode.

In response to determining that the obtained type information indicates the contract usage mode (S22: contract usage mode), the controller 51 determines to maintain the second mode (S23), and ends the operation mode determination process. That is, in the printer 10 operating in the second mode, when the cartridge 13 to be used in the contract usage mode is replaced with the cartridge 13 to be used in the contract usage mode, the operation mode is maintained in the second mode.

Figure 6:
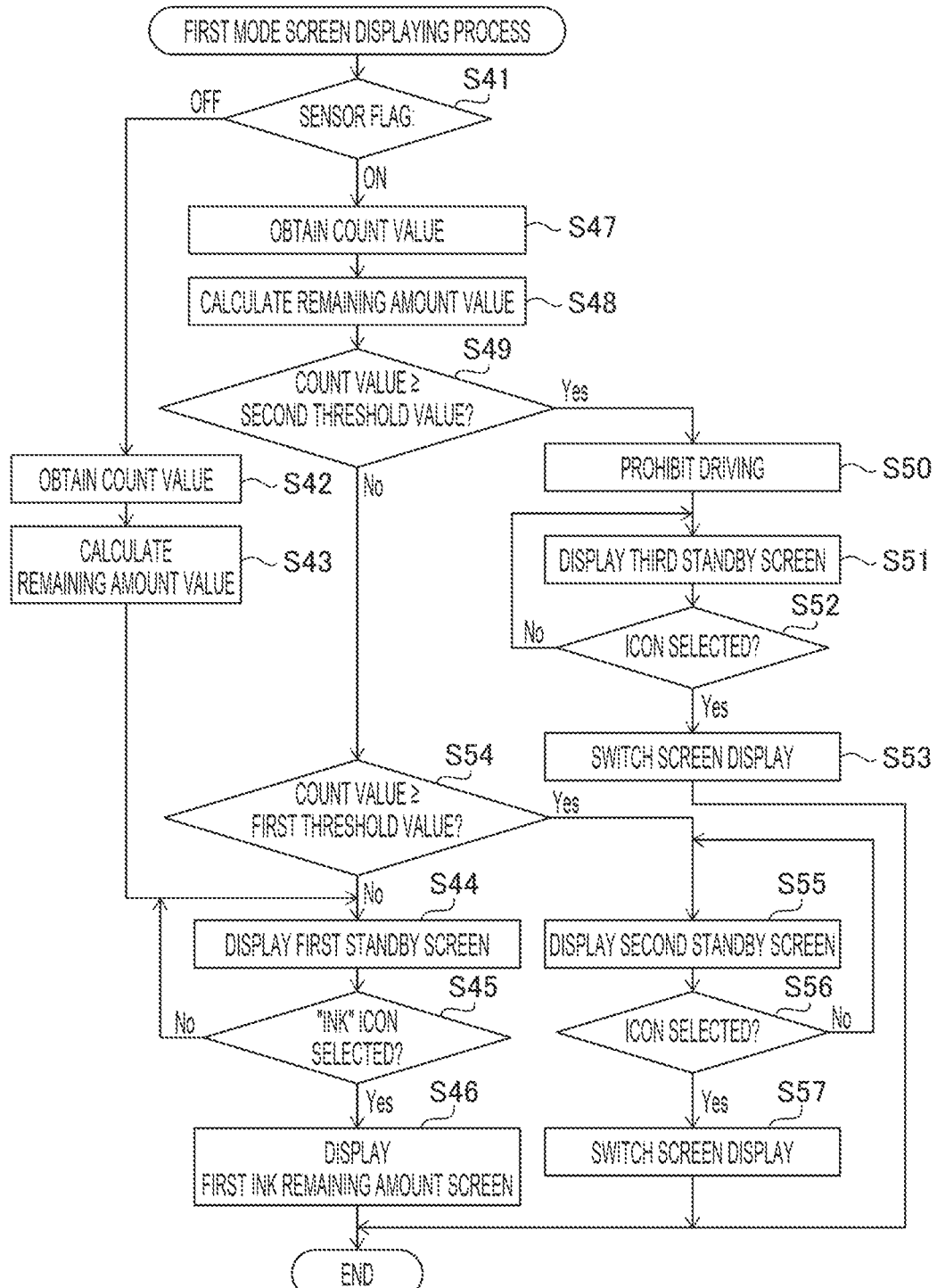
FIG. 6 is a flowchart of a first mode screen displaying process.

The controller 51 executes a first mode screen displaying process illustrated in FIG. 6 or a second mode screen displaying process shown in FIG. 5B in accordance with the operation mode that has been set in the operation mode determination process. First, the first mode screen displaying process will be described with reference to FIG. 6. The controller 51 executes the first mode screen displaying process in response to the value of the first mode flag being "ON" and the value of the second mode flag being "OFF."

First, the controller 51 determines whether a value of a sensor flag stored in EEPROM 57 is "ON" or "OFF" (S41). The sensor flag will be described. An initial value of the sensor flag is "OFF." In response to a change of the detection signal output from the liquid level sensor 38 from the second detection signal to the first detection signal, the controller 51 stores the sensor flag having the value of "ON" in the EEPROM 57. Then, in response to determining that the cartridge 13 has been replaced, the controller 51 stores the sensor flag having the value of "OFF" in the EEPROM 57. That is, in step S41, a process corresponding to a determination as to whether a height position of a surface of liquid stored in the cartridge 13 mounted in the mounting case 32 has lowered to or below the detection position is executed.

An example of the determination of replacement of the cartridge 13 will be described. When the cartridge 13 is mounted to the mounting case 32, the controller 51 obtains the serial number from the IC memory 15 through the cartridge I/F 49. Then, the controller 51 determines whether the serial number stored in the EEPROM 57 of the memory 53 matches the serial number obtained from the IC memory 15. In response to determining that the serial number stored in the EEPROM 57 of the memory 53 does not match the serial number obtained from the IC memory 15, the controller 51 determines that the cartridge 13 has been replaced. In response to determining that the cartridge 13 has been replaced, the controller 51 overwrites the serial number stored in the EEPROM 57 of the memory 53 with the serial number obtained from the IC memory 15.

When determining that the value of the sensor flag is "OFF" (S41: OFF), the controller 51 obtains the count value stored in the EEPROM 57 (S42). The count value is a value that is counted by cumulating every time the controller 51 causes ink to flow out from the head 34. Specifically, when printing on a sheet is executed, the controller 51 calculates the number of times an ink droplet has been ejected as the count value based on print data. Then, the controller 51 adds the new count value to the count value up to the previous printing and stores the result in the EEPROM 57.

In a case where ink is sucked from the nozzles of the head 34 by a pump a maintenance mechanism has, the controller 51 may convert an amount of ink sucked from the head 34 by the pump into, for example, the number of times of ejection of an ink droplet having a particular amount and add the number to the count value. Beside the execution of printing, the controller 51 may calculate the count value and accumulate the count value in a case where the drive element 50 is driven to eject the ink droplets from the nozzles. That is, the controller 51 counts an amount of ink flowing out from the head 34 as the number of times of ejection of the ink droplet. The count value counted by the controller 51 indicates a total number of ink droplets flowing out from the head 34. That is, the count value indicates an amount of ink that flowed out from the head 34, in other words, an amount of ink consumed in the printer 10. It is noted that the count value is counted for every cartridge 13 mounted in the mounting case 32. The count value is reset when the cartridge 13 is replaced.

The controller 51 calculates the remaining amount of ink stored in the cartridge 13 mounted in the mounting case 32 based on the count value obtained in step S42. Specifically, the controller 51 obtains the initial storing amount value stored in the IC memory 15 of the IC chip 14 through the cartridge I/F 49. In a case where the initial storing amount value stored in the IC memory 15 of the IC chip 14 is stored in the EEPROM 57 of the memory 53, the controller 51 may obtain the initial storing amount value stored in the EEPROM 57. The controller 51 calculates the remaining amount value by subtracting the count value from the obtained initial storing amount value (S43).

It is noted that, in a case where the mounting case 32 can hold a plurality of cartridges 13, the controller 51 obtains a count value and calculates a remaining amount value for every cartridge 13 mounted in the mounting case 32.

Figure 8A:
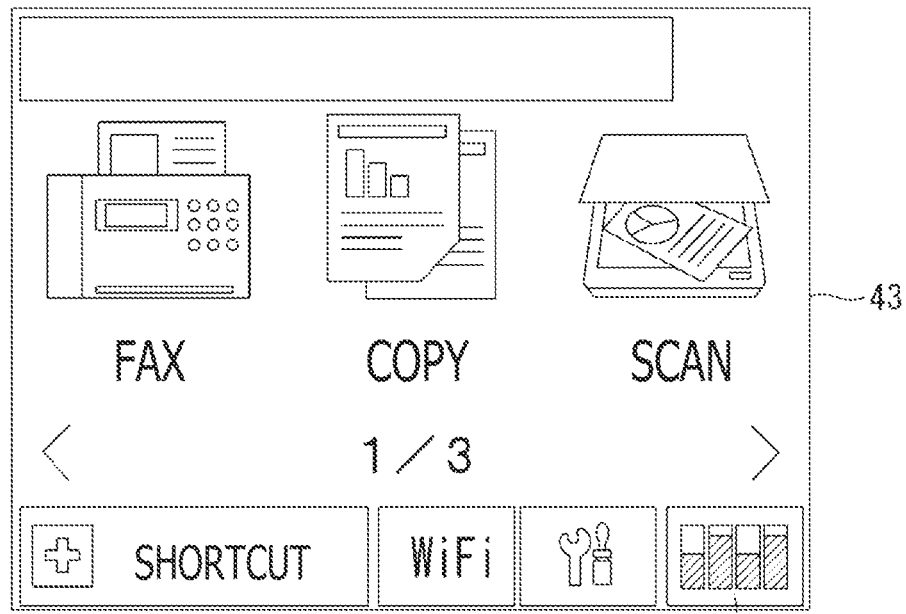
FIG. 8A is a diagram illustrating a first standby screen.

The controller 51 causes the display panel 43 to display a first standby screen illustrated in FIG. 8A using remaining amount values calculated in step S43 (S44). Specifically, the controller 51 generates an "INK" icon 71 using the remaining amount values. Then, the controller 51 generates image data indicating the first standby screen based on the generated "INK" icon 71 and image data stored in the ROM 55, and inputs the generated image data to the display panel 43.

The "INK" icon 71 is a bar having a length corresponding to the calculated remaining amount value. In the illustrated example, the "INK" icon 71 consists of a bar indicating a remaining amount of magenta ink, a remaining amount display bar indicating a remaining amount of cyan ink, a remaining amount display bar indicating a remaining amount of yellow ink, and a remaining amount display bar indicating a remaining amount of black ink.

The first standby screen is a screen to be displayed on the display panel 43 in a case where the value of the sensor flag is "OFF." That is, the first standby screen is displayed on the display panel 43 in a case where the liquid level of the ink stored in the cartridge 13 mounted in the mounting case 32 is higher than or equal to the detection position. Beside the "INK" icon 71, the first standby screen includes various icons such as a "FAX" icon, a "COPY" icon, and a "SCAN" icon. However, the first standby screen does not include a "SERVICE PROVIDER" icon 73 described later.

As shown in FIG. 6, the controller 51 executes a process corresponding to a determination on whether the "INK" icon 71 has been selected on the first standby screen (S45).

Specifically, the controller 51 determines whether position information indicating the "INK" icon 71 is input from the touch sensor 44 (S45). In the following description, the fact that the position information indicating the icon is input to the controller 51 will be simply referred to as "the icon has been selected."

When the controller 51 determines that the "INK" icon 71 has not selected on the first standby screen (S45: No), the controller 51 causes the display panel 43 to continuously display the first standby screen (S44). When the controller 51 determines that the "INK" icon 71 has been selected on the first standby screen (S45: Yes), the controller 51 causes the display panel 43 to display a first ink remaining amount screen illustrated in FIG. 9B (S46). Specifically, the controller 51 generates the remaining amount display bars for respective colors based on the remaining amount values calculated in step S43, and generates image data indicating the first ink remaining amount screen based on the generated remaining amount display bars and the image obtained from ROM 55. Then, the controller 51 inputs the generated image data to the display panel 43.

The first ink remaining amount screen includes characters "M", "C", "Y", and "Bk" indicating colors of ink, and four remaining amount display bars. The four remaining amount display bars have shapes obtained by enlarging the four remaining amount display bars the "INK" icon 71 has.

Although not illustrated in the flowchart, the controller 51 determines whether a condition for switching the screen display from the first ink remaining amount screen to the first standby screen is satisfied. For example, the controller 51 determines that the condition for switching the screen display to the first standby screen is satisfied when an operation signal is input indicating that operation is made from a specific operation switch 45 such as a home button for switching the screen display from the first ink remaining amount screen to the first standby screen. Alternatively, the controller 51 starts counting of a countdown timer after displaying the first ink remaining amount screen, and determines that the condition for switching the screen display to the first standby screen is satisfied in response to the countdown timer being timed up.

When the controller 51 determines that the condition for switching the screen display from the first ink remaining amount screen to the first standby screen is satisfied, the controller 51 switches the screen display from the first ink remaining amount screen to the first standby screen. Although not illustrated in the flowchart, in response to another icon such as the "FAX" icon being selected on the first standby screen, the controller 51 causes the display panel 43 to display a screen corresponding to the selected icon.

When the controller 51 determines that in step S41 the value of the sensor flag is "ON" (S41: ON), the controller 51 obtains the count value stored in EEPROM 57 (S47). It is noted that, although not illustrated in the flowchart, the controller 51 stores the sensor flag having a value of "ON" in the EEPROM 57 in response to a change of the detection signal output from the liquid level sensor 38 from the second detection signal to the first detection signal. Then, the controller 51 resets the count value in response to the sensor flag having the value of "ON" being stored in the EEPROM 57 and performs accumulation of the count value. That is, the count value obtained by the controller 51 from the EEPROM 57 in step S47 indicates the amount of ink flowed out from the head after the liquid surface of the ink stored in the cartridge 13 mounted in the mounting case 32 reached the detection position.

The controller 51 calculates the remaining amount value based on the count value obtained in step S47 (S48). In detail, the controller 51 obtains a fixed initial value from the ROM 55. The fixed initial value is a value indicating a remaining amount of ink stored in the cartridge 13 of when the liquid surface of the ink stored in the cartridge 13 mounted in the mounting case 32 reached the detection position, and is a value that is stored in advance in the ROM 55. The controller 51 calculates the remaining amount value by subtracting the count value obtained in step S47 from the obtained fixed initial value (S48). It is noted that the controller 51 obtains the count value and calculates the remaining amount value for every cartridge 13 mounted in the mounting case 32.

Next, the controller 51 determines whether the count value obtained in step S47 is greater than or equal to a second threshold value stored in the EEPROM 57 (S49). The second threshold value is a value that is stored in advance in the EEPROM 57 as a value at which a problem occurs in the printer 10 if ink further flows out of the head 34.

When the controller 51 determines that the count value obtained in step S47 is greater than or equal to the second threshold value (S49: Yes), the controller 51 prohibits driving of the drive element 50 and the pump the maintenance mechanism described above has (S50). That is, the controller 51 prohibits the ink from flowing out of the head 34. Specifically, the controller 51 stores an empty flag having a value of "ON" in the EEPROM 57. The controller 51 checks the value of the empty flag before driving the drive element 50 and the above-described pump, and drives the drive element 50 and the above-described pump in a case where the value of the empty flag is "OFF." When the value of the empty flag is "ON", the controller 51 does not drive the drive element 50 and the pump described above.

Next, the controller 51 causes the display panel 43 to display a third standby screen (S51). Specifically, the controller 51 generates the "INK" icon 71 (FIG. 9A) in the same manner as the "INK" icon 71 included in the first standby screen using the remaining amount value calculated in step S49. Then, the controller 51 generates image data indicating the third standby screen based on the generated "INK" icon 71 and image data stored in the ROM 55, and inputs the generated image data to the display panel 43.

Figure 9A:
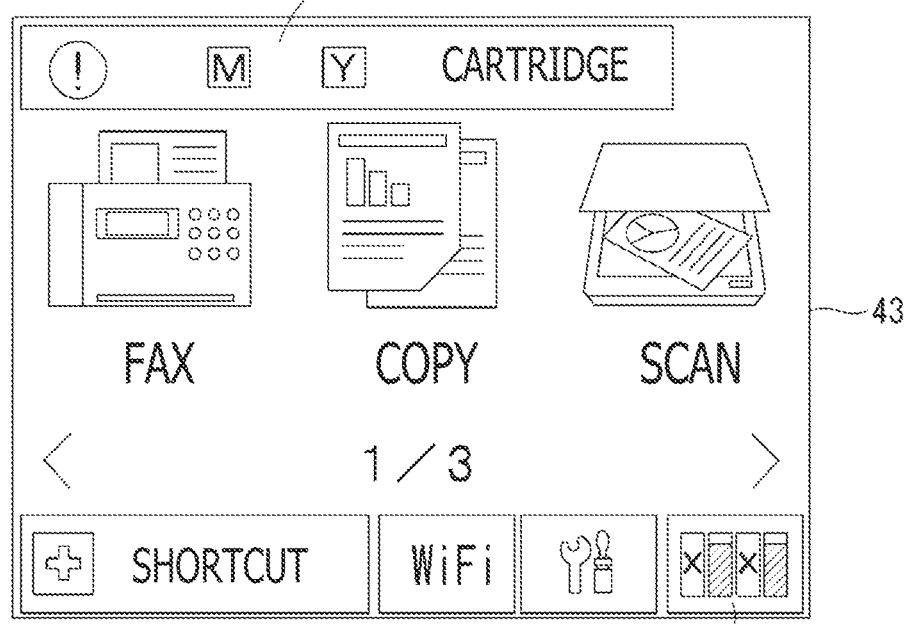
FIG. 9A is a diagram illustrating a third standby screen.
Figure 9B:
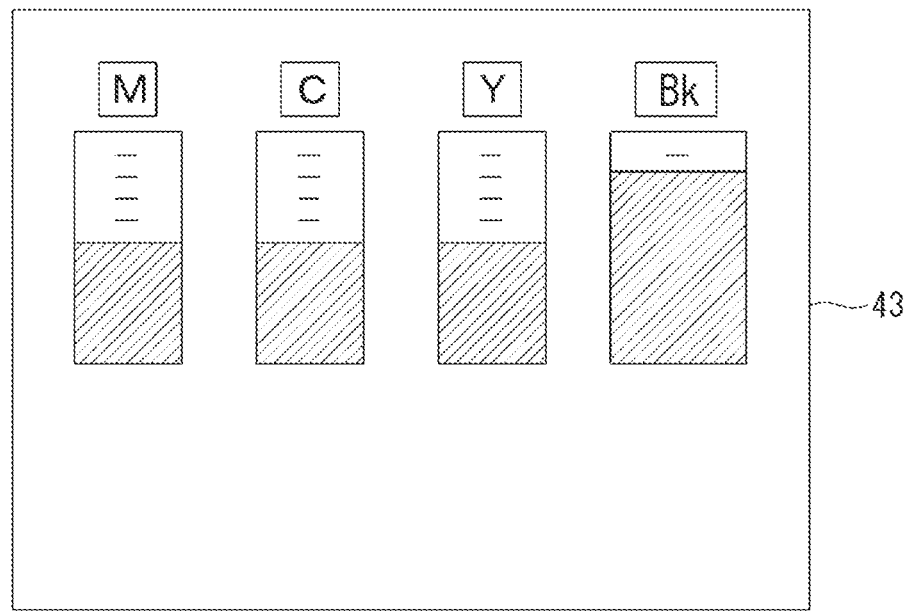
FIG. 9B is a diagram illustrating a first ink remaining amount screen.

The third standby screen illustrated in FIG. 9A includes various icons such as the "FAX" icon, the "COPY" icon, and the "SCAN" icon as in the first standby screen, in addition to the "INK" icon 71, "X" objects, and a "NOTIFICATION" icon 74. However, the third standby screen does not include a "SERVICE PROVIDER" icon 73 described later.

The "X" objects are displayed by being superimposed on the "INK" icon 71. Specifically, the "X" objects are displayed by being superimposed on the remaining amount display bars indicating the remaining amounts of ink stored in the cartridges 13 whose count values are greater than or equal to the second threshold value. In the illustrated example, the "X" objects are displayed by superposing on the leftmost remaining amount display bar displaying the remaining amount of the cyan ink and the second remaining amount display bar from the right displaying the remaining amount of the yellow ink.

The "NOTIFICATION" icon 74 includes a symbol "!," a character indicating the color of ink, and characters "CARTRIDGE." In the illustrated example, the "NOTIFICATION" icon 74 includes a character "M" indicating a magenta color and a character "Y" indicating a yellow color. The "NOTIFICATION" icon 74 allows the user to recognize cartridges 13 that needs to be replaced.

As shown in FIG. 6, the controller 51 determines whether the "INK" icon 71 or the "NOTIFICATION" icon 74 has been selected on the third standby screen (S52). When the controller 51 determines that the "INK" icon 71 or the "NOTIFICATION" icon 74 has not been selected on the third standby screen (S52: No), the controller 51 causes the display panel 43 to continuously display the third standby screen (S51).

When the controller 51 determines that the "INK" icon 71 has been selected on the third standby screen (S52: Yes), the controller 51 switches the display screen (S53) and causes the display panel 43 to display a third ink remaining amount screen illustrated in FIG. 10B. Specifically, the controller 51 generates the remaining amount display bar of each color based on the remaining amount value calculated in step S48. Then, the controller 51 generates image data indicating the third ink remaining amount screen based on the generated remaining amount display bars and image data obtained from the ROM 55. The controller 51 inputs the generated image data to the display panel 43. The third ink remaining amount screen includes characters "M", "C", "Y", and "Bk" indicating the colors of ink, and four remaining amount display bars. The four remaining amount display bars have shapes obtained by enlarging the four remaining amount display bars the "INK" icon 71 has.

The "X" objects are displayed by being superimposed on the remaining amount display bars of the cartridges 13 that need to be replaced. In the illustrated example, the "X" objects are displayed by being superimposed on the left-end remaining amount display bar corresponding to the cartridge 13 that stores magenta ink and the second remaining amount display bar from the right corresponding to the cartridge 13 that stores yellow ink.

On the other hand, when the controller 51 determines that the "NOTIFICATION" icon 74 has been selected on the third standby screen (S52: Yes), the controller 51 switches the display screen (S53) and causes the display panel 43 to display a model number display screen illustrated in FIG. 11A. Specifically, the controller 51 reads image data indicating the model number display screen stored in advance in the ROM 55 of the memory 53 from the ROM 55 and outputs the image data to the display panel 43.

The model number display screen includes a character indicating a color of ink and a model number. In the illustrated example, the model number display screen includes a character "M" indicating magenta and characters "M01234" indicating the model number of the cartridge 13 storing magenta ink. The model number display screen also includes a character "Y" indicating yellow and characters "Y56789" indicating the model number of the cartridge 13 storing yellow ink. It is noted that, although not illustrated in the flowchart, the controller 51 may cause the display panel 43 to display the model number display screen shown in FIG. 11A in response to selection of a "!" icon 72 on the third ink remaining amount screen shown in FIG. 10B.

Although not illustrated in the flowchart of FIG. 6, the controller 51 determines whether a condition for switching the screen display from the third ink remaining amount screen or the model number display screen to the third standby screen is satisfied. For example, the controller 51 determines that the condition for switching the screen display to the third standby screen is satisfied when the operation signal is input indicating that operation is made from a specific operation switch 45 such as the above-described home button. Alternatively, the controller 51 starts counting of a countdown timer after displaying the third ink remaining amount screen or the model number display screen, and determines that the condition for switching the screen display to the third standby screen is satisfied in response to the countdown timer being timed up.

When the controller 51 determines that the condition for switching the screen display from the third ink remaining amount screen or the model number display screen to the third standby screen is satisfied, the controller 51 switches the screen display from the third ink remaining amount screen or the model number display screen to the third standby screen. When the controller 51 determines that the count value obtained in step S47 is not greater than or equal to the second threshold value (S49: No), the controller 51 determines whether the count value obtained in step S47 is greater than or equal to the first threshold value (S54). The first threshold value is a value smaller than the second threshold value and is a value stored in advance in the EEPROM 57.

When the controller 51 determines that the count value obtained in step S47 is not greater than or equal to the first threshold value (S54: No), the controller 51 executes the processes on and after step S44 described above. When the controller 51 determines that the count value obtained in step S47 is greater than or equal to the first threshold value (S54: Yes), the controller 51 causes the display panel 43 to display the second standby screen (S55). Specifically, the controller 51 generates the "INK" icon 71 (FIG. 8B) in the same manner as the "INK" icon 71 included in the first standby screen using the remaining amount value calculated in step S48. Then, the controller 51 generates image data indicating the second standby screen based on the generated "INK" icon 71 and image data stored in the ROM 55, and inputs the generated image data to the display panel 43.

Figure 8B:
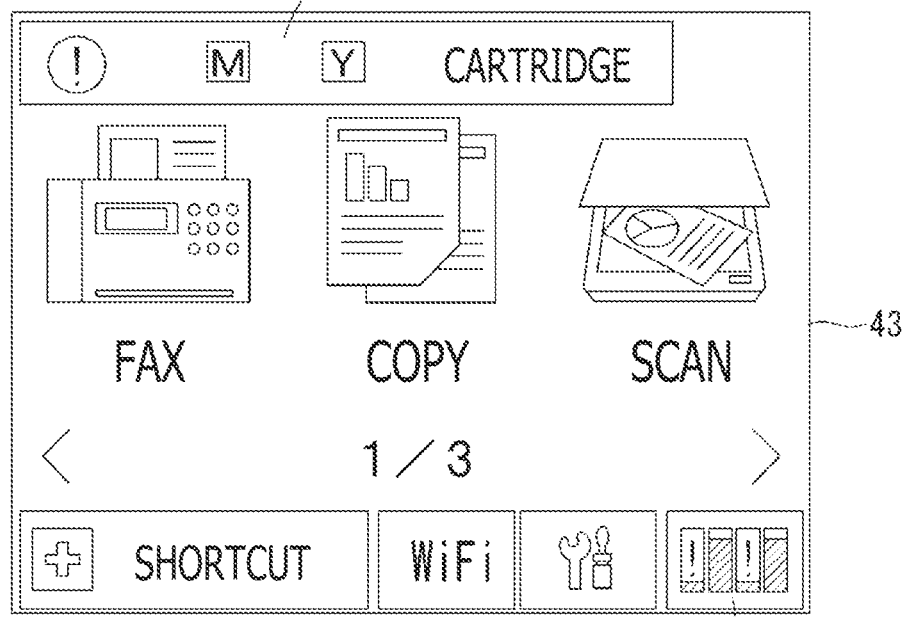
FIG. 8B is a diagram illustrating a second standby screen.

The second standby screen illustrated in FIG. 8B includes various icons such as the "FAX" icon, the "COPY" icon, and the "SCAN" icon as in the first standby screen, in addition to the "INK" icon 71, "!" objects and the "NOTIFICATION" icon 74. However, the second standby screen does not include a "SERVICE PROVIDER" icon 73 described later.

The "!" objects are displayed by being superimposed on the "INK" icon 71. Specifically, the "!" object is displayed by being superimposed on the remaining amount display bar indicating the remaining amount of ink stored in the cartridge 13 whose count value is greater than or equal to the first threshold value and less than the second threshold value. In the illustrated example, the "!" objects are displayed by being superimposed on the leftmost remaining amount display bar that displays the remaining amount of cyan ink and the second remaining amount display bar from the right that displays the remaining amount of yellow ink.

The "NOTIFICATION" icon 74 is the same as the "NOTIFICATION" icon 74 included in the third standby screen, and includes a symbol "!," a character indicating the color of ink, and characters "CARTRIDGE."

As illustrated in FIG. 6, the controller 51 determines whether the "INK" icon 71 or the "NOTIFICATION" icon 74 has been selected on the second standby screen (S56). When the controller 51 determines that the "INK" icon 71 and the "NOTIFICATION" icon 74 have not been selected on the second standby screen (S56: No), the controller 51 causes the display panel 43 to continuously display the second standby screen (S55).

When the controller 51 determines that the "INK" icon 71 has been selected on the second standby screen (S56: Yes), the controller 51 switches the display screen (S57) and causes the display panel 43 to display a second ink remaining amount screen illustrated in FIG. 10A. Specifically, the controller 51 generates the remaining amount display bar of each color based on the remaining amount value calculated in step S48. Then, the controller 51 generates image data indicating the second ink remaining amount screen based on the generated remaining amount display bars and image data obtained from the ROM 55. The controller 51 inputs the generated image data to the display panel 43.

The second ink remaining amount screen includes characters "M", "C", "Y", and "Bk" indicating the colors of ink, and four remaining amount display bars. The four remaining amount display bars have shapes obtained by enlarging the four remaining amount display bars of the "INK" icon 71.

The "!" objects are displayed by being superimposed on the remaining amount display bars corresponding to the cartridges 13 to be purchased. In the illustrated example, the "!" objects are displayed by being superimposed on the left-end remaining amount display bar corresponding to the cartridge 13 storing magenta ink and the second remaining amount display bar from the right corresponding to the cartridge 13 storing yellow ink.

On the other hand, when the controller 51 determines that the "NOTIFICATION" icon 74 has been selected on the second standby screen (S56: Yes), the controller 51 switches the display screen (S57) and causes the display panel 43 to display the model number display screen illustrated in FIG. 11A. Specifically, the controller 51 reads image data indicating the model number display screen stored in advance in the ROM 55 of the memory 53 and outputs the image data to the display panel 43.

Figure 10A:
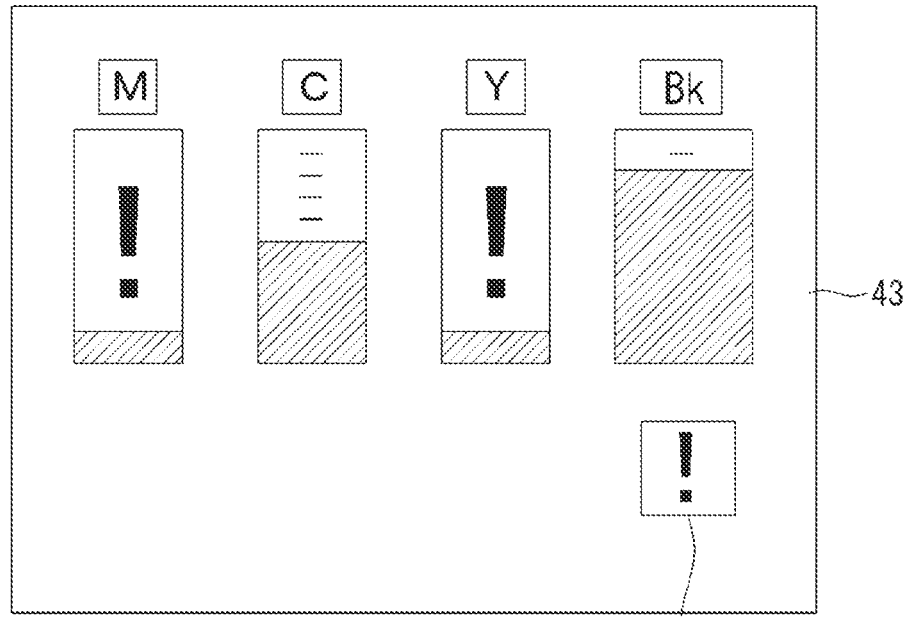
FIG. 10A is a diagram illustrating a second ink remaining amount screen.
Figure 10B:
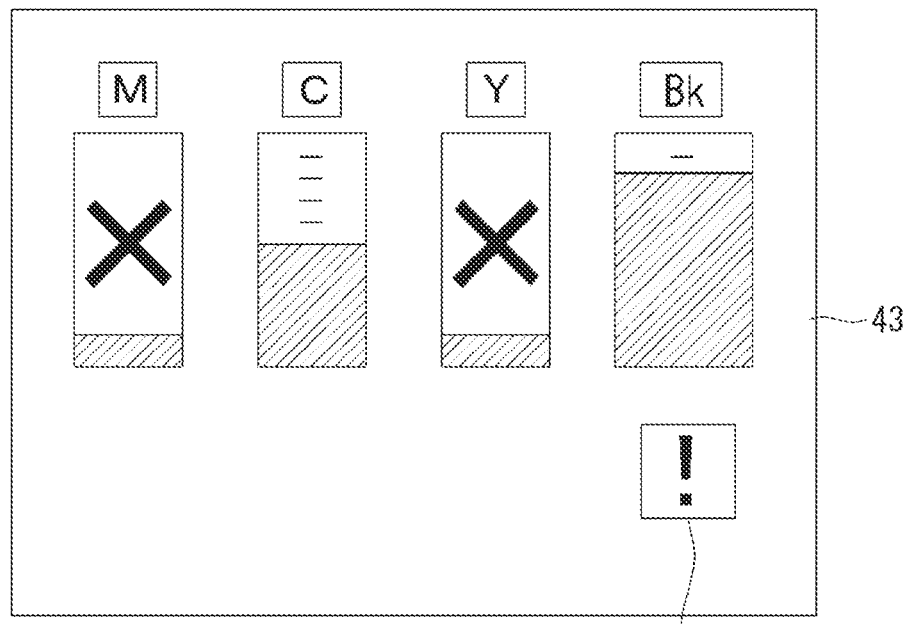
FIG. 10B is a diagram illustrating a third ink remaining amount screen.
Figure 11A:
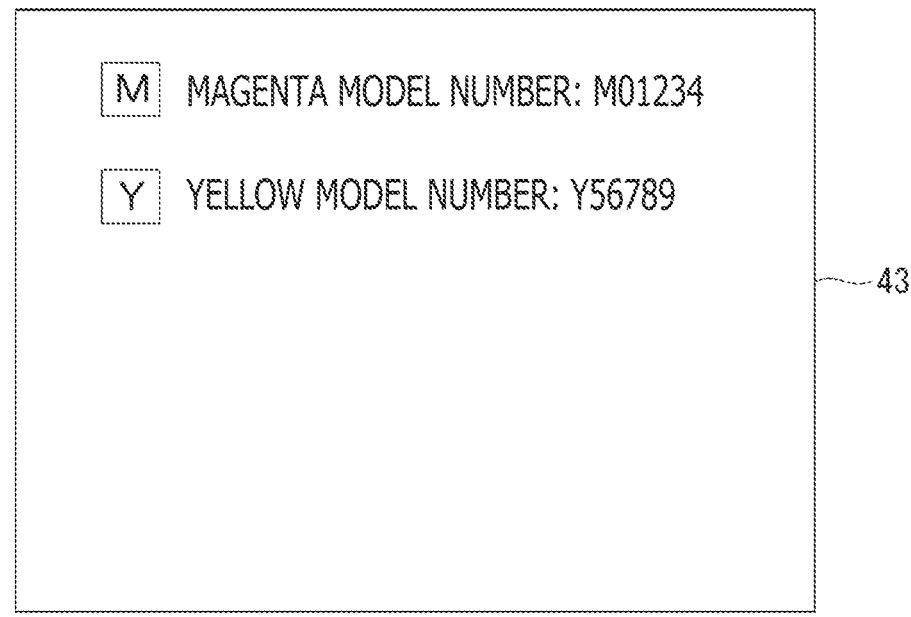
FIG. 11A is a diagram illustrating a model number display screen.
Figure 11B:
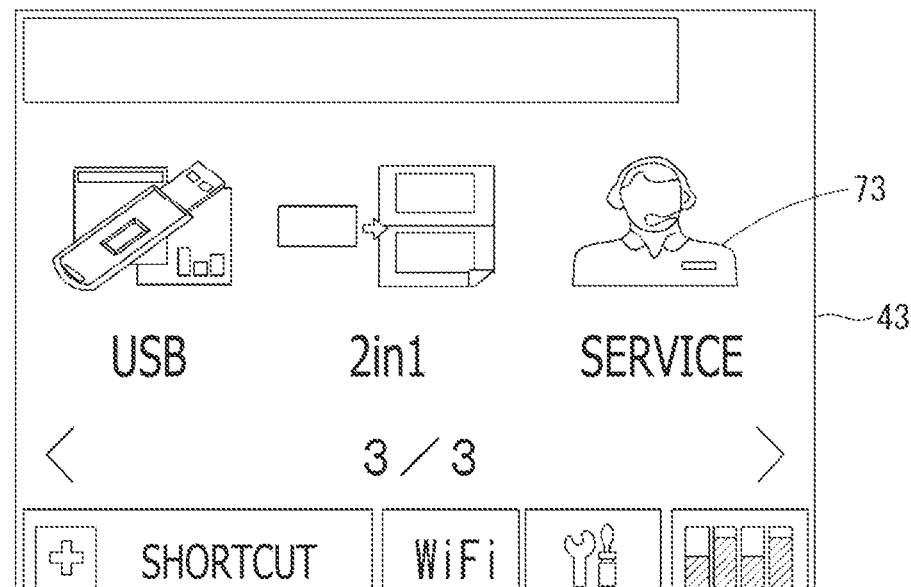
FIG. 11B is a diagram illustrating a fourth standby screen.

It is noted that, although not illustrated in the flowchart, the controller 51 may cause the display panel 43 to display the model number display screen shown in FIG. 11A in response to the selection of the "!" icon 72 on the second ink remaining amount screen shown in FIG. 10A.

Although not illustrated in the flowchart shown in FIG. 6, the controller 51 determines whether a condition for switching the screen display from the second ink remaining amount screen or the model number display screen to the second standby screen is satisfied. For example, the controller 51 determines that the condition for switching the screen display to the second standby screen is satisfied when an operation signal is input indicating that operation is made from a specific operation switch 45 such as the above-described home button. Alternatively, the controller 51 starts counting of a countdown timer after displaying the second ink remaining amount screen or the model number display screen, and determines that the condition for switching the screen display to the second standby screen is satisfied in response to the countdown timer being timed up.

When the controller 51 determines that the condition for switching the screen display from the second ink remaining amount screen or the model number display screen to the second standby screen is satisfied, the controller 51 switches the screen display from the second ink remaining amount screen or the model number display screen to the second standby screen.

Although not illustrated in the flowchart, the controller 51 continuously executes the first mode screen displaying process until the power is turned off, and ends the first mode screen displaying process in response to the power being turned off.

Next, the second mode screen displaying process will be described with reference to FIG. 5B. It is noted that processes similar to those in the first mode screen displaying process are denoted by the same step numbers as those in the first mode screen displaying process, and the descriptions thereof are omitted. The controller 51 executes the second mode screen displaying process in response to the value of the first mode flag being "OFF" and the value of the second mode flag being "ON."

When the controller 51 determines in step S41 that the value of the sensor flag is "OFF" (S41: OFF), the controller 51 executes the processes of step S42 and step S43 in the same manner as the first mode screen displaying process, and causes the display panel 43 to display a fourth standby screen illustrated in FIG. 11B (S61). Specifically, the controller 51 generates the remaining amount display bar of each color based on the remaining amount value calculated in step S43, and generates image data indicating the fourth standby screen based on the generated remaining amount display bars and image data obtained from the ROM 55. Then, the controller 51 inputs the generated image data to the display panel 43.

The fourth standby screen includes a "SERVICE PROVIDER" icon 73 in addition to the "INK" icon 71, the "FAX" icon, the "COPY" icon, the "SCAN" icon, a "USB" icon, and a "2in1" icon. The "SERVICE PROVIDER" icon 73 is an icon that is not included in the standby screens in the first mode screen displaying process described above.

The controller 51 determines whether the "INK" icon 71 or the "SERVICE PROVIDER" icon 73 has been selected on the fourth standby screen (S62). Specifically, the controller 51 determines whether the "INK" icon 71 has been selected and whether the "SERVICE PROVIDER" icon 73 has been selected on the fourth standby screen.

When the controller 51 determines that the "INK" icon 71 has been selected (S62: Yes), the controller 51 switches the screen display (S63), and causes the display panel 43 to display the first ink remaining amount screen illustrated in FIG. 9B in the same manner as in the first mode screen displaying process. When the controller 51 determines that the "SERVICE PROVIDER" icon 73 has been selected (S62: Yes), the controller 51 switches the screen display (S63) and causes the display panel 43 to display a provider information display screen shown in FIG. 12A. Specifically, the controller 51 generates image data indicating the provider information display screen based on the service provider information stored in EEPROM 57 at step S30 and image data stored in ROM 55, and inputs the generated image data to the display panel 43.

The provider information display screen includes characters "service provider name: company A," characters "TEL: 987654321," characters "FAX: 123456789," characters "E-mail: abcd@efgh.ij," and characters "URL: https: www.klmn.pq.rs." The provider information display screen further includes a "CONTACT" icon 75 and a "CANCEL" icon 76.

The characters "COMPANY A," "987654321," "123456789," "abcd@efgh.ij," and "https:www.klmn.pq.rs" are the service provider information stored in the EEPROM 57 by the controller 51 in step S30. The characters "SERVICE PROVIDER NAME," "TEL," "FAX," "E-mail:" and "URL," the "CONTACT" icon 75, and the "CANCEL" icon 76 are image data stored in the ROM 55 in advance.

The provider information display screen allows the user to recognize the name, telephone number, fax number, e-mail address, and URL of the service provider with which the user has made a contract. It is noted that, in a case where the service provider does not disclose the URL on the Internet using the information processing device 11, the server, or the like, the controller 51 causes the display panel 43 to display characters such as "URL: https: none" on the provider information display screen. Alternatively, the controller 51 does not cause the display panel 43 to display characters and figures related to the URL on the provider information display screen.

Although not illustrated in the flowchart, when the controller 51 determines that the "CONTACT" icon 75 has been selected, the controller 51 makes a call to the telephone number included in the service provider information. Alternatively, the controller 51 transmits image data to the fax number included in the service provider information. Alternatively, the controller 51 transmits an e-mail to the e-mail address included in the service provider information. Alternatively, the controller 51 transmits an HTTP request to the URL included in the service provider information.

The image data transmitted to the fax number includes data such as the name, telephone number, and e-mail address of the user. The name, telephone number, and e-mail address of the user are input to the printer 10 in advance by the user or operator. The controller 51 stores the name, telephone number, and e-mail address of the user input from the touch sensor 44, the operation switch 45, and/or the communication I/F 47 in the EEPROM 57.

Although not shown in the flowchart, when the controller 51 determines that the "CANCEL" icon 76 has been selected, the controller 51 switches the display to another screen such as the fourth standby screen. Although not illustrated in the flowchart, the controller 51 determines whether a condition for switching the screen display from the first ink remaining amount screen or the provider information display screen to the fourth standby screen is satisfied. For example, the controller 51 determines that the condition for switching the screen display to the fourth standby screen is satisfied when an operation signal is input indicating that operation is made from a specific operation switch 45 such as the above-described home button. Alternatively, the controller 51 starts counting of a countdown timer after causing the display panel 43 to display the first ink remaining amount screen or the provider information display screen. Then, the controller 51 determines that the condition for switching the screen display to the fourth standby screen is satisfied in response to the countdown timer being timed up.

When the controller 51 determines that the condition for switching the screen display from the first ink remaining amount screen or the provider information display screen to the fourth standby screen is satisfied, the controller 51 switches the screen display from the first ink remaining amount screen or the provider information display screen to the fourth standby screen. Although not illustrated in the flowchart, in response to another icon such as the "FAX" icon having been selected on the fourth standby screen, the controller 51 causes the display panel 43 to display a screen corresponding to the selected icon.

When the controller 51 determines that in step S41 the value of the sensor flag is "ON" (S41: ON), the controller 51 executes the processes of steps S47 and S48 and then executes the process of step S49. When the controller 51 determines that in step S49 the count value obtained in step S47 is not greater than or equal to the second threshold value (S49: No), the controller 51 executes the processes on and after step S61. That is, in the second mode screen displaying process, the controller 51 does not cause the display panel 43 to display the "!" object (FIG. 8B) and the model number display screen (FIG. 11A) which are displayed on the display panel 43 in the first mode screen displaying process.

When the controller 51 determines that in step S49 the count value obtained in step S47 is greater than or equal to the second threshold value, the controller 51 executes the process of step S50 in the same manner as in the first mode screen displaying process. That is, the controller 51 prohibits the outflow of ink from the head 34 regardless of whether the first mode screen displaying process or the second mode screen displaying process is performed.

Figure 13:
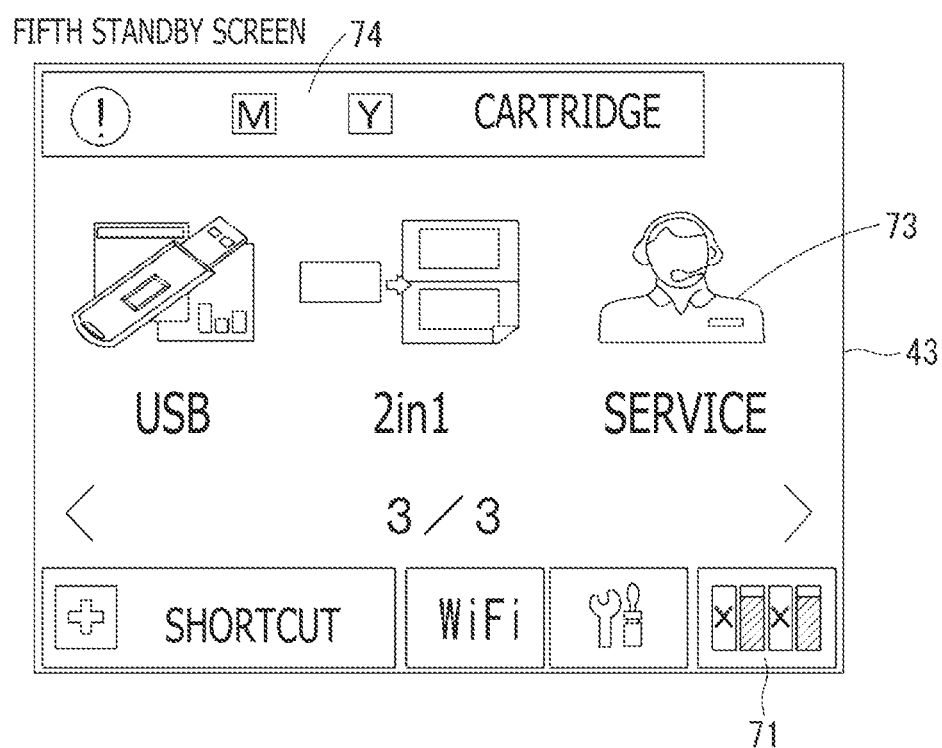
FIG. 13 is a diagram illustrating a fifth standby screen.

Next, the controller 51 causes the display panel 43 to display a fifth standby screen (S64). As shown in FIG. 13, the fifth standby screen is a screen further including the "X" objects and the "NOTIFICATION" icon 74 described in the first mode screen displaying process in addition to the "SERVICE PROVIDER" icon 73 and the like included in the fourth standby screen.

As shown in FIG. 5B, the controller 51 determines whether the "INK" icon 71, the "NOTIFICATION" icon 74, or the "SERVICE PROVIDER" icon 73 has been selected on the fifth standby screen (S65). When the controller 51 determines that the "INK" icon 71, the "NOTIFICATION" icon 74, and the "SERVICE PROVIDER" icon 73 have not been selected on the fifth standby screen (S65: No), the controller 51 causes the display panel 43 to continuously display the fifth standby screen.

When the controller 51 determines that the "NOTIFICATION" icon 74 or the "SERVICE PROVIDER" icon 73 has been selected on the fifth standby screen (S65: Yes), the controller 51 switches the screen display (S66). Then, the controller 51 displays the provider information display screen shown in FIG. 12A on the display panel 43 in the same manner as in step S63. That is, in the second mode screen displaying process, in a case where the "NOTIFICATION" icon 74 is selected, not the model number display screen (FIG. 11A) but the provider information display screen is displayed on the display panel 43.

When the controller 51 determines that the "INK" icon 71 has been selected on the fifth standby screen (S65: Yes), the controller 51 switches the screen display (S66). Then, the controller 51 causes the display panel 43 to display the third ink remaining amount screen illustrated in FIG. 10B in the same manner as in the first mode screen displaying process.

Although not illustrated in the flowchart, when the "!" icon 72 is selected on the third ink remaining amount screen, the controller 51 causes the display panel 43 to display not the model number display screen (FIG. 11A) but the provider information display screen. It is noted that the "!" icon 72 may not be displayed on the third ink remaining amount screen. Although not illustrated in the flowchart, the controller 51 continues to execute the second mode screen displaying process until the power is turned off, and ends the second mode screen displaying process in response to the power being turned off.

Figure 7:
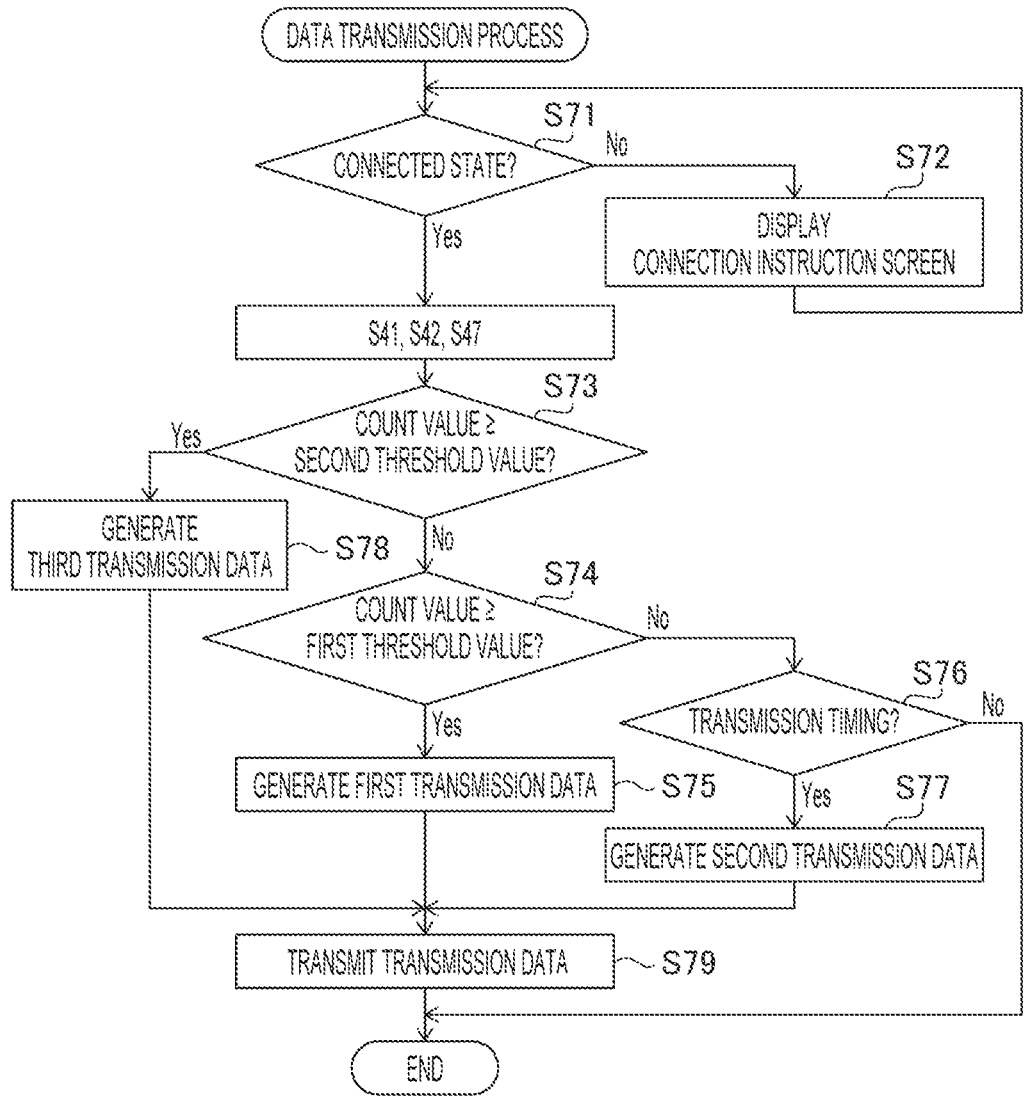
FIG. 7 is a flowchart of a data transmission process.

Next, a data transmission process in which the controller 51 transmits an E-mail or an HTTP request including status information such as the remaining amount value will be described with reference to FIG. 7. For example, the controller 51 executes the data transmission process in response to causing the ink to flow out from the head 34 by executing printing or maintenance and in response to coming of a transmission timing. That is, when the amount of ink stored in the cartridge 13 changes and the transmission timing comes, the data transmission process is executed. The transmission timing is, for example, a fixed time or every particular time. The transmission timing is information input to the printer 10 by the operator, the user, or the service provider using the information processing device 11, a personal computer, a tablet, or a portable terminal. The controller 51 stores the transmission timing input through the touch sensor 44, the operation switch 45, and/or the communication I/F 47 in the EEPROM 57. In response to date and time indicated by date and time information output by the clock module 46 becoming date and time indicated by the transmission timing, the controller 51 determines that the transmission timing has come.

First, the controller 51 executes a process corresponding to a determination on whether the communication I/F 47 is connected to a local network such as a LAN or a personal computer (S71). For example, the controller 51 outputs a PING command through the communication I/F 47. Then, the controller 51 determines that the communication I/F 47 is connected to the local network or the personal computer in response to receiving an ACK (acknowledgement). The controller 51 determines that the communication I/F 47 is not connected to the local network or the personal computer in response to not receiving the ACK even if retry is executed a particular number of times.

It is noted that, instead of determining whether the communication I/F 47 is connected to a local network such as a LAN or a personal computer, the controller 51 may determine whether communication with the information processing device 11 through the Internet 12 is possible. The controller 51 transmits an HTTP request including a reply request to the URL disclosed by the information processor 11 through the communication I/F 47. Then, the controller 51 determines that the communication with the information processing device 11 is possible in response to receiving an HTTP response including the ACK. The controller 51 determines that the communication with the information processing device 11 is not possible in response to the fact that the ACK could not be received even if retry is performed a particular number of times. Alternatively, the controller 51 may determine whether the communication with the information processing device 11 through the Internet 12 is possible based on whether information transmitted by the information processing device 11 has been received within a particular period. The controller 51 determines that communication with the information processing device 11 is possible in response to receiving information from the information processing device 11 within the particular period, and determines that the communication with the information processing device 11 is not possible in response to not having been able to obtain information from the information processing device 11 within the particular period.

When the controller 51 determines that the communication I/F 47 is not connected to the local network or the personal computer (S71: No), the controller 51 causes the display panel 43 to display a connection instruction screen (S72). Specifically, the controller 51 reads image data indicating the connection instruction screen from the ROM 55, and inputs the read image data to the display panel 43.

Figure 12A:
FIG. 12A is a diagram illustrating a provider information display screen.
Figure 12B:
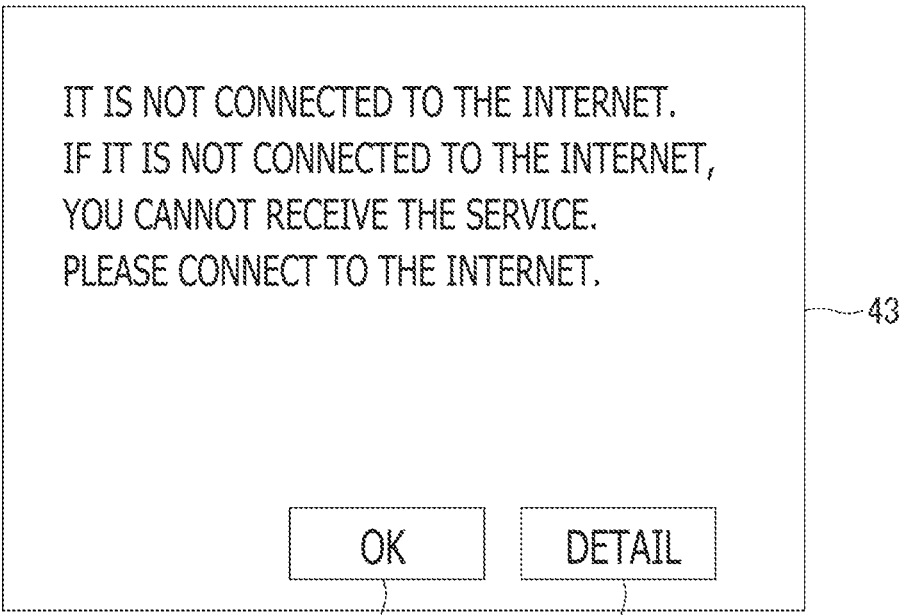
FIG. 12B is a diagram illustrating a connection instruction screen.

As shown in FIG. 12B, the connection instruction screen includes characters "IT IS NOT CONNECTED TO THE INTERNET." and characters "IF IT IS NOT CONNECTED TO THE INTERNET, YOU CANNOT RECEIVE THE SERVICE. PLEASE CONNECT TO THE INTERNET." The connection instruction screen further includes an "OK" icon 77 and a "DETAIL" icon 78.

Although not illustrated in the flowchart, in response to selection of the "DETAIL" icon 78, the controller 51 causes the display panel 43 to display a screen displaying, for example, detailed information for connecting to the Internet. Image data indicating this screen is stored in the ROM 55 in advance. Then, in response to selection of the "OK" icon 77 on the connection instruction screen, the controller 51 executes the process of step S71 again.

When the controller 51 determines that in step S71 the communication I/F 47 is connected to the local network or the PC (S71: Yes), the controller 51 executes processes similar to S41, S42, and S47 in the first mode screen displaying processing to obtain the count value. Then, the controller 51 determines whether the obtained count value is greater than or equal to the second threshold value (S73).

When the controller 51 determines that the obtained count value is greater than or equal to the second threshold value (S73: Yes), the controller 51 generates third transmission data (S78). Specifically, the controller 51 obtains empty information indicating that the ink stored in the cartridge 13 is used up from the ROM 55 or the EEPROM 57 and includes the empty information in the third transmission data. Further, the controller 51 obtains the model number of the cartridge 13 in which the ink has been used up from the EEPROM 57, or from the IC memory 15 through the cartridge I/F 49, and includes the obtained model number in the third transmission data. In addition, the controller 51 obtains identification information for identifying the printer 10 or the user from the EEPROM 57 and includes the identification information in the third transmission data. The information for identifying the printer 10 is, for example, a serial number or a MAC address of the printer 10. The identification information for identifying the user is, for example, a user ID, and is information input to the printer 10 by an operator or a user. The controller 51 stores the identification information input through the touch sensor 44, the operation switch 45, or the communication I/F 47 in the EEPROM 57.

When the controller 51 determines that the obtained count value is not greater than or equal to the second threshold value (S73: No), the controller 51 determines whether the count value is greater than or equal to the first threshold value (S74). When the controller 51 determines that the obtained count value is greater than or equal to the first threshold value (S74: Yes), the controller 51 generates first transmission data (S75). Specifically, the controller 51 obtains replacement information indicating that the arrangement of the cartridge 13 is necessary from the ROM 55 or the EEPROM 57 and includes the replacement information in the first transmission data. Further, the controller 51 obtains the model number of the cartridge 13 that needs to be arranged from the EEPROM 57, or from the IC memory 15 through the cartridge I/F 49, and includes the model number in the first transmission data. The controller 51 obtains identification information for identifying the printer 10 or the user from the EEPROM 57 and includes the identification information in the first transmission data.

When the controller 51 determines that the obtained count value is not greater than or equal to the first threshold value (S74: No), the controller 51 determines whether the data transmission process has been executed in response to coming of the transmission timing (S76). When the controller 51 determines that the data transmission process has been executed in response to coming of the transmission timing (S76: Yes), the controller 51 generates second transmission data (S77). Specifically, the controller 51 calculates the remaining amount values of all the cartridges 13 mounted in the mounting case 32 in the same manner as in steps S43 and S48 described above, and includes the calculated remaining amount values and the model numbers of the cartridges 13 while associating the calculated remaining amount values with the model numbers of the cartridges 13. Further, the controller 51 obtains the identification information for identifying the printer 10 or the user from the EEPROM 57 and includes the identification information in the second transmission data.

When the controller 51 determines that the data transmission process has been executed under a condition other than coming of the transmission timing such as the execution of printing (S76: No), the controller 51 skips the processes of steps S77 and S79 and ends the data transmission process.

After executing the processes of steps S75, S77, and S78, the controller 51 transmits an e-mail including the generated transmission data to the e-mail address included in the service provider information through the communication I/F 47 (S79). Alternatively, the controller 51 transmits an HTTP request including the generated transmission data to the URL included in the service provider information through the communication I/F 47.

The transmitted e-mail is received by the information processing device 11 through the mail server. Alternatively, the transmitted HTTP request is received by the information processing device 11. The information processing device 11 stores the received transmission data in the memory 66. Based on the transmission data received by the information processing device 11, the service provider monitors the remaining amount of ink in the printer 10 or arranges shipment of a new cartridge 13.

It is noted that, in addition to the first transmission data, the second transmission data and the third transmission data described above, the controller 51 may generate transmission data including failure information and transmit the transmission data by an e-mail or an HTTP request.

The controller 51 may also include information other than the empty information, the replacement information and the remaining amount information described above in the first transmission data, the second transmission data or the third transmission data and transmit the first transmission data, the second transmission data or the third transmission data by an e-mail or an HTTP request.

As described above, the IC memory 15 of the IC chip 14 the cartridge 13 has stores the first identification information of "0" indicating the normal usage mode or the second identification information of "1" indicating the contract usage mode. The controller 51 sets the operation mode to the first mode in response to obtaining the first identification information from the IC memory 15, and sets the operation mode to the second mode in response to obtaining the second identification information. Then, the controller 51 executes the first mode screen displaying process in response to setting to the first mode, and executes the second mode screen displaying process in response to setting to the second mode. Therefore, the printer 10 can display different screens on the display panel 43 in accordance with the usage mode.

In the normal usage mode in which the user uses the printer 10 without making a contract with the service provider, the controller 51 causes the display panel 43 to display the model number of the cartridge 13 to be purchased. On the other hand, in the contract usage mode in which the user makes a contract with the service provider to use the printer 10, the controller 51 causes the display panel 43 to display not the model number of the cartridge 13 but the service provider information. Therefore, in the normal usage mode, the printer 10 can allow the user to recognize the model number of the cartridge 13 to be purchased. And, in the contract usage mode, the printer 10 can allow the user to recognize information about the service provider such as the name and contact address of the service provider to be contacted. That is, the printer 10 can allow the user to recognize appropriate information in accordance with the usage mode.

As described above, the controller 51 sets the operation mode to the second mode only in a case where the input of the preparation information is received (S13: Yes) and the cartridge 13 to be used in the contract usage mode is mounted in the mounting case 32 (S33: contract usage mode). That is, the controller 51 does not set the operation mode to the second mode based solely on the fact that the cartridge 13 to be used in the contract usage mode is mounted in the mounting case 32. Therefore, the printer 10 can prevent the information related to the service provider from being displayed on the display panel 43 by error and the model number of the cartridge 13 to be displayed from not being displayed on the display panel 43 by error.

As described above, even in a case where the operation mode is set to the second mode (S15: second mode), when the controller 51 determines that the cartridge 13 to be used in the normal usage mode is mounted in the mounting case 32, the controller 51 changes the operation mode to the first mode (S19). Therefore, in a case where the service provider desires to allow the user to continue to use the printer 10 after the end of the contract with the user, the service provider can change the operation mode of the printer 10 from the second mode to the first mode only by mounting the cartridge 13 for the normal usage mode to the mounting case 32. That is, the printer 10 can reduce labor of the service provider to change the operation mode from the second mode to the first mode.

As described above, in the first mode screen displaying process, when the controller 51 determines that the remaining amount of the ink stored in the cartridge 13 has become small, the controller 51 causes the display panel 43 to display the second standby screen including the "NOTIFICATION" icon 74 and the "!" object (S55). Then, in response to selection of the "NOTIFICATION" icon 74, the controller 51 causes the display panel 43 to display the model number of the cartridge 13 to be purchased (FIG. 11A). On the other hand, in the second mode screen displaying process, the controller 51 causes the display panel 43 to display the fourth standby screen (FIG. 11B) including the "SERVICE PROVIDER" icon 73 (S61). Then, in response to selection of the "SERVICE PROVIDER" icon 73, the controller 51 causes the display panel 43 to display the provider information display screen (FIG. 12A). Therefore, in a case where the remaining amount of ink stored in the cartridge 13 has become small, the controller 51 can cause the user to recognize the model number of the cartridge 13 in the normal usage mode, and can prompt the user to contact the service provider in the contract usage mode.

There may be a difference between the amount of ink indicated by the count value and the amount of ink that actually flowed out from the head 34. The difference may become larger as the count value becomes larger. In the present embodiment, as described above, the controller 51 resets the count value when the liquid surface of ink stored in the cartridge 13 reaches the detection position, and performs accumulation of the count value using the time when the liquid surface reached the detection position as a starting point (S47). Therefore, in a case where the position of the liquid surface is lower than the detection position, the printer 10 can reduce the difference between the amount of ink indicated by the count value and the amount of ink that actually flowed out from the head 34, as compared with a case where the count value is not reset using the liquid level sensor 38. That is, the controller 51 can accurately determine the amount of ink that flowed out from the head 34 in a state where the position of the liquid surface is lower than the detection position as compared with a case where the liquid level sensor 38 is not used.

As described above, regardless of whether the operation mode is the first mode or the second mode, when the controller 51 determines that the count value is greater than or equal to the second threshold value (S49: Yes), the controller 51 prohibits the outflow of ink from the head 34 (S50). The second threshold value is a value that is stored in advance in the EEPROM 57 as a value at which a problem occurs in the printer 10 if ink further flows out of the head 34. Therefore, regardless of whether the printer 10 is used in the normal usage mode or in the contract usage mode, it is possible to prevent the occurrence of the problem in the printer 10.

When the controller 51 determines that the count value is greater than or equal to the second threshold value (S49: Yes), the controller 51 displays the "X" object by being superimposed on the "INK" icon 71 on the standby screen regardless of the operation mode. Therefore, the printer 10 can prompt the user to replace the cartridge 13 regardless of whether the printer 10 is used in the normal usage mode or in the contract usage mode.

In a case where the controller 51 determines that the count value is greater than or equal to the second threshold value (S49: Yes) and the operation mode is set to the first mode, when the "NOTIFICATION" icon 74 is selected, the controller 51 displays the model number of the cartridge 13 on the display panel 43. On the other hand, in a case where the controller 51 determines that the count value is greater than or equal to the second threshold value (S49: Yes) and the operation mode is set to the second mode, when the "NOTIFICATION" icon 74 is selected, the controller 51 displays information related to the service provider on the display panel 43. That is, in a case where the cartridge 13 needs to be replaced, the printer 10 displays the model number of the cartridge 13 on the display panel 43 when used in the normal usage mode, and displays information related to the service provider on the display panel 43 when used in the contract usage mode. Therefore, the printer 10 can prompt the user using the printer 10 in the normal usage mode to purchase the cartridge 13, and can prompt the user using the printer 10 in the contract usage mode to contact the service provider.

As described above, when the controller 51 determines that the communication I/F 47 is not connected to a personal computer or a LAN (S71: No), the controller 51 causes the display panel 43 to display the connection instruction screen (FIG. 12B) (S72). Therefore, the printer 10 can prompt the user to connect the printer 10 to a communication line such as a personal computer or a LAN.

As described above, the controller 51 causes the display panel 43 to display the "INK" icon 71 on the standby screen regardless of whether the operation mode is the first mode or the second mode. Then, in response to selection of the "INK" icon 71, the controller 51 causes the display panel 43 to display the ink remaining amount screen. Therefore, regardless of whether the operation mode is the first mode or the second mode, the printer 10 can allow the user to recognize the remaining amount of ink stored in the cartridge 13 mounted in the mounting case 32.

As described above, when the controller 51 determines that the "CONTACT" icon 75 has been selected, the controller 51 makes a call to the telephone number included in the service provider information, transmits image data to the facsimile number included in the service provider information, transmits an e-mail to the e-mail address included in the service provider information, or transmits an HTTP request to the URL included in the service provider information. Therefore, the printer 10 can eliminate the user's labor of confirming the contact address of the service provider and connecting the line.

As described above, in a state where the controller 51 is not in the ready mode (S13: No), the controller 51 causes the display panel 43 to display the second error screen in response to obtaining the type information indicating the contract usage mode from the IC memory 15 through the cartridge I/F 49 (S18). The second error screen includes characters such as "ERROR" and "CARTRIDGE IS NOT MOUNTED IN AN APPROPRIATE PROCEDURE. PLEASE MOUNT THE CARTRIDGE IN AN APPROPRIATE PROCEDURE." Therefore, the printer 10 can be prevented from entering the second mode without going through a normal procedure in which the operator inputs the preparation information to the printer 10.

In the above-described embodiment, the liquid level sensor 38 that detects the position of the liquid surface of the ink stored in the cartridge 13 is described as an example of the sensor. However, the sensor may be any sensor as long as it can detect a value that changes in accordance with the position of the liquid surface of ink stored in the cartridge 13. For example, an actuator that moves in accordance with the position of the liquid surface or a prism whose refractive index changes in accordance with the position of the liquid surface may be positioned on the optical path of the liquid level sensor 38 instead of the liquid surface of the cartridge 13.

In the above-described embodiment, an example has been described in which an icon or an object to be displayed on the standby screen or the ink remaining amount screen is determined based on whether the count value is greater than or equal to the first threshold value or the second threshold value. However, the remaining amount value may be used in place of the count value. For example, the controller 51 may determine an icon or an object to be displayed on the standby screen or the ink remaining amount screen in accordance with whether the calculated remaining amount value is less than a threshold value.

The printer 10 in the above-described embodiment is an example of an image recording device according to aspects of the present disclosures. The communication cable and the LAN in the above-described embodiment are examples of a communication line according to aspects of the present disclosures. The touch sensor 44 and the operation switch 45 in the above-described embodiment are examples of a user interface and an information input interface according to aspects of the present disclosures. The mounting case 32 in the above-described embodiment is an example of a cartridge mount according to aspects of the present disclosures. The ink and toner in the above-described embodiment are examples of a consumable according to aspects of the present disclosures. The cartridge I/F 49 in the above-described embodiment is an example of a cartridge interface and an information input interface according to aspects of the present disclosures. The liquid level sensor 38 in the above-described embodiment is an example of a sensor according to aspects of the present disclosures. The amount of ink stored in the cartridge 13 of when the liquid level coincides with the detection position in the above-described embodiment is an example of a particular amount according to aspects of the present disclosures. The IC memory 15 in the above-described embodiment is an example of a cartridge memory according to aspects of the present disclosures. The type information of "0" in the above-described embodiment is an example of first identification information according to aspects of the present disclosures. The type information of "1" in the above-described embodiment is an example of second identification information according to aspects of the present disclosures. The model number assigned to the cartridge 13 to be used in the normal usage mode in the above-described embodiment is an example of the first identification information according to aspects of the present disclosures. The model number assigned to the cartridge 13 to be used in the contract usage mode in the above-described embodiment is an example of the second identification information according to aspects of the present disclosures. The print engine 40 in the above-described embodiment is an example of a print engine according to aspects of the present disclosures, and the print engine includes at least the recording unit 29. The head 34 in the above-described embodiment is an example of a consuming part according to aspects of the present disclosures. The communication I/F 47 in the above-described embodiment is an example of an information input interface according to aspects of the present disclosures. The first threshold value in the above-described embodiment is an example of a threshold value according to aspects of the present disclosures. The second threshold value in the above-described embodiment is an example of a prohibition threshold value according to aspects of the present disclosures. The ready mode in the above-described embodiment is an example of an obtainable state according to aspects of the present disclosures. The characters such as "ERROR" or "CARTRIDGE IS NOT MOUNTED IN AN APPROPRIATE PROCEDURE. PLEASE MOUNT THE CARTRIDGE IN AN APPROPRIATE PROCEDURE." in the above-described embodiment are examples of an error object according to aspects of the present disclosures. Outflow of ink from the head 34 such as ejection of ink droplets from the head 34 and suction of ink from the head 34 in the above-described embodiment are examples of consumption of consumables according to aspects of the present disclosures. The remaining amount display bars the "INK" icon 71 has in the above-described embodiment are examples of a remaining amount object according to aspects of the present disclosures. The "X" objects in the above-described embodiment are examples of a replacement object according to aspects of the present disclosures. The characters "M01234" indicating the model number of the cartridge 13 storing the magenta ink and the character "Y56789" indicating the model number of the cartridge 13 storing the yellow ink in the above-described embodiment are examples of a cartridge type object according to aspects of the present disclosures. The "!" object and the "NOTIFICATION" icon 74 in the above-described embodiment are examples of a notification object according to aspects of the present disclosures. The controller 51 obtaining the position information indicating the "CONTACT" icon 75 from the touch sensor 44 in the above-described embodiment is an example of obtaining a contact instruction according to aspects of the present disclosures. The characters "IT IS NOT CONNECTED TO THE INTERNET." or the characters "IF IT IS NOT CONNECTED TO THE INTERNET, YOU CANNOT RECEIVE THE SERVICE. PLEASE CONNECT TO THE INTERNET." in the above-described embodiment are examples of a guide object according to aspects of the present disclosures. The "SERVICE PROVIDER" icon 73 in the above-described embodiment is an example of a provider information object according to aspects of the present disclosures.

What is claimed is:

1. An image recording device comprising a display panel, a cartridge mount configured to hold a cartridge, an information input interface, memory, and a controller,
    wherein the controller is configured to:
        obtain service provider information related to a service provider through the information input interface;
        store the obtained service provider information in the memory;
        obtain first identification information or second identification information related to a cartridge mounted in the cartridge mount;
        set an operation mode to a first mode in response to obtaining the first identification information, the first mode is where the image recording device is not under a contract with the service provider;
        set the operation mode to a second mode in response to obtaining the second identification information, the second mode is where the image recording device is under a contract with the service provider;
        cause the display panel to display a cartridge type object indicating a type of the cartridge in response to setting the operation mode to the first mode; and
        cause the display panel to display a provider information object indicating the service provider information in response to setting the operation mode to the second mode.

2. The image recording device according to claim 1, wherein the controller is configured to:
    obtain preparation information through the information input interface; and
    shift to an obtainable state in which the second identification information is obtainable in response to obtaining the preparation information.

3. The image recording device according to claim 2, wherein the information input interface includes a cartridge interface located in the cartridge mount, and
    wherein the controller is configured to set the operation mode to the second mode in response to obtaining the second identification information from a cartridge memory of the cartridge through the cartridge interface in the obtainable state.

4. The image recording device according to claim 3, wherein the information input interface includes a cartridge interface located in the cartridge mount, and
    wherein the controller is configured to cause the display panel to display an error object indicating an error in response to obtaining the second identification information from the cartridge memory through the cartridge interface in a state in which the controller is not in the obtainable state.

5. The image recording device according to claim 1, wherein the information input interface includes a cartridge interface located in the cartridge mount, and
    after setting the operation mode to the second mode, the controller is configured to:
        maintain the second mode in response to obtaining the second identification information from a cartridge memory of the cartridge through the cartridge interface; and
        change the operation mode from the second mode to the first mode in response to not obtaining the first identification information.

6. The image recording device according to claim 1, further comprising a consuming part configured to consume a consumable supplied from the cartridge mounted in the cartridge mount, wherein the controller is configured to:
    count a value in response to consumption by the consuming part, wherein the counted value is used to calculate an amount of the consumable in the cartridge;
    determine whether the counted value has reached a threshold value;
    cause the display panel to display a notification object indicating at least one of a remaining amount of the consumable being small or replacement of the cartridge on condition that the operation mode is set to the first mode and the controller determines that the counted value has reached the threshold value; and
    cause the display panel to display the service provider information on condition that the operation mode is set to the second mode and the controller determines that the counted value has reached the threshold value.

7. The image recording device according to claim 6, wherein the controller is configured to:
    determine whether the counted value has reached a prohibition threshold value stored in the memory; and
    prohibit an operation in which the consuming part consumes the consumable regardless of whether the operation mode is the first mode or the second mode and cause the display panel to display a replacement object indicating replacement of the cartridge on condition that the controller determines that the counted value has reached the prohibition threshold value.

8. The image recording device according to claim 1, further comprising:
    a consuming part configured to consume a consumable supplied from the cartridge mounted in the cartridge mount; and
    a sensor configured to output a detection signal in a case where an amount of the consumable stored in the cartridge mounted in the cartridge mount is less than a particular amount,
wherein the controller is configured to:
    cause the display panel to display a notification object indicating at least one of a remaining amount of ink being small or replacement of the cartridge on condition that the operation mode is set to the first mode and the detection signal output by the sensor is obtained; and
    cause the display panel to display the service provider information on condition that the operation mode is set to the second mode and the detection signal output by the sensor is obtained.

9. The image recording device according to claim 1, wherein the information input interface includes a communication interface, and
wherein the controller is configured to:
    determine whether the communication interface is connected to a communication line; and
    cause the display panel to display a guide object indicating at least one of connecting to the communication line or a fact that a service cannot be received on condition that the operation mode is set to the second mode and the controller determines that the communication interface is not connected to the communication line.

10. The image recording device according to claim 1, further comprising a consuming part configured to consume a consumable supplied from the cartridge mounted in the cartridge mount,
wherein the controller is configured to:
    count a value in response to consumption by the consuming part, wherein the counted value indicates an amount of the consumable consumed by the consuming part;
    calculate a remaining amount value indicating a remaining amount of the consumable stored in the cartridge mounted in the cartridge mount based on the counted value; and
    cause the display panel to display a remaining amount object indicating the calculated remaining amount value regardless of whether the operation mode is the first mode or the second mode.

11. The image recording device according to claim 1, wherein the information input interface includes a communication interface and a user interface, and
wherein the controller is configured to establish a connected state in which communication with a contact address included in the service provider information is possible through the communication interface and a communication line in response to obtaining a contact instruction through the user interface.

12. An image recording device comprising a display panel, a cartridge mount configured to hold a cartridge, an information input interface, memory, and a controller,
    wherein the controller is configured to:
        obtain service provider information related to a service provider through the information input interface;
        store the obtained service provider information in the memory;
        determine whether cartridge information related to a cartridge mounted in the cartridge mount indicates first identification information or second identification information;
        set an operation mode to a first mode in response to determining that the cartridge information indicates the first identification information;
        set the operation mode to a second mode in response to determining that the cartridge information indicates the second identification information;
        cause the display panel to display a cartridge type object indicating a type of the cartridge in response to setting the operation mode to the first mode; and
        cause the display panel to display a provider information object indicating the service provider information in response to setting the operation mode to the second mode.

* * * * *